US008283813B2

(12) United States Patent
Gilchrist et al.

(10) Patent No.: US 8,283,813 B2
(45) Date of Patent: Oct. 9, 2012

(54) ROBOT DRIVE WITH MAGNETIC SPINDLE BEARINGS

(75) Inventors: Ulysses Gilchrist, Reading, MA (US); Martin Hosek, Lowell, MA (US); Jairo Terra Moura, Marlboro, MA (US); Jay Krishnasamy, Billerica, MA (US); Christopher Hofmeister, Hampstead, NH (US)

(73) Assignee: Brooks Automation, Inc., Chelmsford, MA (US)

( * ) Notice: Subject to any disclaimer, the term of this patent is extended or adjusted under 35 U.S.C. 154(b) by 465 days.

(21) Appl. No.: 12/163,996

(22) Filed: Jun. 27, 2008

(65) Prior Publication Data

US 2009/0243413 A1    Oct. 1, 2009

Related U.S. Application Data

(60) Provisional application No. 60/946,687, filed on Jun. 27, 2007.

(51) Int. Cl.
*H02K 7/09*    (2006.01)

(52) U.S. Cl. ........... 310/12.14; 310/12.19; 310/67 R; 310/90.5; 310/114; 310/12.15; 414/744.5; 901/15; 901/23; 74/490.01; 74/490.03

(58) Field of Classification Search ............ 310/67 R, 310/90, 90.5, 114, 154.01, 154.03, 254.1, 310/12.14, 12.15, 12.19; 414/744.5; 901/15, 901/23; 74/490.01, 490.03
See application file for complete search history.

(56) References Cited

U.S. PATENT DOCUMENTS

| | | | |
|---|---|---|---|
| 2,564,221 | A | 8/1951 | Hornfeck |
| 3,205,485 | A | 9/1965 | Bernard |
| 3,560,774 | A | 2/1971 | Reeves |
| 3,697,992 | A | 10/1972 | Kleptz et al. |

(Continued)

FOREIGN PATENT DOCUMENTS

CN    1226307 A    8/1999

(Continued)

OTHER PUBLICATIONS

A study of the Rotor Eccentricity Compensation of Bearingless Induction Motor, Zhang et al., Jun. 2004, pp. 148-150, 164 and 201, vol. 8, No. 2, Editorial Board of Electric Machines & Control, China.

(Continued)

*Primary Examiner* — Quyen Leung
*Assistant Examiner* — David Scheuermann
(74) *Attorney, Agent, or Firm* — Perman & Green, LLP; Colin C. Durham

(57) ABSTRACT

A drive section for a substrate transport arm including a frame, at least one stator mounted within the frame, the stator including a first motor section and at least one stator bearing section and a coaxial spindle magnetically supported substantially without contact by the at least one stator bearing section, where each drive shaft of the coaxial spindle includes a rotor, the rotor including a second motor section and at least one rotor bearing section configured to interface with the at least one stator bearing section, wherein the first motor section is configured to interface with the second motor section to effect rotation of the spindle about a predetermined axis and the at least one stator bearing section is configured to effect at least leveling of a substrate transport arm end effector connected to the coaxial spindle through an interaction with the at least one rotor bearing section.

10 Claims, 29 Drawing Sheets

U.S. PATENT DOCUMENTS

| | | | |
|---|---|---|---|
| 3,860,843 A | 1/1975 | Kawasaki et al. | |
| 4,144,110 A | 3/1979 | Luc | 156/73.5 |
| 4,210,865 A | 7/1980 | Nikolaev et al. | |
| 4,547,678 A | 10/1985 | Metzner et al. | |
| 4,556,886 A | 12/1985 | Shimizu et al. | |
| 4,609,332 A | 9/1986 | Miki et al. | 417/352 |
| 4,628,499 A | 12/1986 | Hammett | |
| 4,689,945 A | 9/1987 | Lattion et al. | 57/263 |
| 4,717,874 A | 1/1988 | Ichikawa et al. | |
| 4,774,465 A | 9/1988 | Nilius | |
| 4,874,998 A | 10/1989 | Hollis, Jr. | 318/568.21 |
| 4,922,197 A | 5/1990 | Juds | |
| 4,956,945 A | 9/1990 | Ooshima | 51/165.93 |
| 4,992,733 A | 2/1991 | Griebeler | |
| 5,003,260 A | 3/1991 | Auchterlonie | |
| 5,015,998 A | 5/1991 | Ellis et al. | |
| 5,092,453 A | 3/1992 | Bruke | 198/673 |
| 5,105,113 A | 4/1992 | Ishikura et al. | |
| 5,120,034 A | 6/1992 | Van Engelen et al. | |
| 5,124,863 A | 6/1992 | Koizumi et al. | |
| 5,126,610 A | 6/1992 | Fremerey | 310/90.5 |
| 5,202,695 A | 4/1993 | Hollandsworth et al. | |
| 5,204,621 A | 4/1993 | Hermann et al. | |
| 5,210,490 A | 5/1993 | Munch et al. | |
| 5,270,600 A * | 12/1993 | Hashimoto | 310/75 D |
| 5,285,154 A | 2/1994 | Burreson | 324/207.16 |
| 5,324,155 A | 6/1994 | Goodwin et al. | 414/225 |
| 5,334,892 A | 8/1994 | Chitayat | |
| 5,351,004 A | 9/1994 | Daniels et al. | 324/207.13 |
| 5,386,738 A | 2/1995 | Havenhill | |
| 5,444,368 A | 8/1995 | Horber | 324/207.16 |
| 5,450,009 A | 9/1995 | Murakami | |
| 5,469,053 A | 11/1995 | Laughlin | |
| 5,530,306 A | 6/1996 | Ueyama | 310/90.5 |
| 5,532,531 A | 7/1996 | Sakamoto | |
| 5,550,413 A | 8/1996 | Bernus et al. | 310/36 |
| 5,555,715 A | 9/1996 | Paweletz et al. | 57/414 |
| 5,568,048 A | 10/1996 | Schroeder et al. | 324/207.21 |
| 5,574,364 A | 11/1996 | Kajimoto et al. | 324/207.12 |
| 5,589,769 A | 12/1996 | Krahn | |
| 5,606,256 A | 2/1997 | Takei | |
| 5,625,240 A | 4/1997 | Bernus | 310/90.5 |
| 5,633,545 A | 5/1997 | Albrecht et al. | |
| 5,642,298 A | 6/1997 | Mallory et al. | 364/561 |
| 5,670,876 A | 9/1997 | Dilger et al. | |
| 5,741,113 A | 4/1998 | Bacchi et al. | 414/744.5 |
| 5,753,991 A | 5/1998 | Couture et al. | |
| 5,801,721 A | 9/1998 | Gandy et al. | 347/3 |
| 5,808,389 A | 9/1998 | Stephenson | 310/168 |
| 5,808,437 A | 9/1998 | Schob | |
| 5,813,823 A * | 9/1998 | Hofmeister | 414/744.5 |
| 5,818,137 A | 10/1998 | Nichols et al. | 310/90.5 |
| 5,838,121 A | 11/1998 | Fairbairn et al. | 318/45 |
| 5,886,432 A | 3/1999 | Markle | |
| 5,899,658 A | 5/1999 | Hofmeister | 414/744.5 |
| 5,914,548 A | 6/1999 | Watanabe et al. | 310/88 |
| 5,924,975 A | 7/1999 | Goldowsky | |
| 5,932,947 A | 8/1999 | Kim | 310/90.5 |
| 5,955,882 A | 9/1999 | Eisschiel et al. | |
| 5,961,291 A | 10/1999 | Sakagami et al. | 417/42 |
| 6,015,272 A | 1/2000 | Antaki et al. | 417/356 |
| 6,018,881 A | 2/2000 | Spies | |
| 6,049,148 A | 4/2000 | Nichols et al. | 310/68 |
| 6,054,851 A | 4/2000 | Masreliez et al. | |
| 6,058,760 A | 5/2000 | Van Heyningen | 73/1.79 |
| 6,078,119 A | 6/2000 | Satoh et al. | |
| 6,085,760 A | 7/2000 | Chodorow | |
| 6,086,362 A | 7/2000 | White et al. | 432/243 |
| 6,096,231 A | 8/2000 | Schertler | 216/41 |
| 6,100,618 A | 8/2000 | Schoeb et al. | 310/90.5 |
| 6,100,681 A | 8/2000 | Tsuruta | |
| 6,127,749 A | 10/2000 | Sogard | |
| 6,144,132 A | 11/2000 | Nashiki | |
| 6,147,421 A | 11/2000 | Takita et al. | |
| 6,175,174 B1 | 1/2001 | Takahashi | 310/90.5 |
| 6,176,668 B1 | 1/2001 | Kurita et al. | 414/217 |
| 6,189,404 B1 | 2/2001 | Hatake et al. | 74/490.03 |
| 6,191,415 B1 | 2/2001 | Stridsberg | |
| 6,206,176 B1 | 3/2001 | Blonigan et al. | 198/619 |
| 6,208,045 B1 | 3/2001 | Hazelton et al. | |
| 6,209,045 B1 | 3/2001 | Hasegawa et al. | |
| 6,227,817 B1 | 5/2001 | Paden | 417/356 |
| 6,235,172 B1 | 5/2001 | Begin et al. | 204/298.27 |
| 6,244,835 B1 | 6/2001 | Antaki et al. | 417/356 |
| 6,246,233 B1 | 6/2001 | Griffen et al. | 324/207.21 |
| 6,261,247 B1 | 7/2001 | Ishikawa et al. | 600/587 |
| 6,269,552 B1 | 8/2001 | Honda et al. | 34/317 |
| 6,285,097 B1 | 9/2001 | Hazelton et al. | |
| 6,285,107 B1 | 9/2001 | Sawada et al. | |
| 6,324,134 B1 | 11/2001 | Ohtachi et al. | 369/44.32 |
| 6,326,750 B1 | 12/2001 | Marcinkiewicz | |
| 6,384,500 B1 | 5/2002 | Chassoulier et al. | 310/90.5 |
| 6,414,742 B1 | 7/2002 | Korenaga et al. | |
| 6,416,215 B1 | 7/2002 | Terentiev | 366/273 |
| 6,431,011 B1 | 8/2002 | Feller | 73/861.12 |
| 6,445,093 B1 | 9/2002 | Binnard | |
| 6,447,265 B1 | 9/2002 | Antaki et al. | 417/354 |
| 6,447,266 B2 | 9/2002 | Antaki et al. | 417/356 |
| 6,448,760 B1 | 9/2002 | Neumann et al. | 324/207.2 |
| 6,471,459 B2 | 10/2002 | Blonigan et al. | 414/217 |
| 6,485,531 B1 | 11/2002 | Schob | 29/25.01 |
| 6,498,411 B2 | 12/2002 | Kanebako | |
| 6,509,732 B1 | 1/2003 | Rhodes et al. | |
| 6,522,130 B1 | 2/2003 | Lutz | 324/207.2 |
| 6,532,791 B2 | 3/2003 | Schmid et al. | 702/94 |
| 6,537,011 B1 | 3/2003 | Wang et al. | 414/217 |
| 6,557,957 B2 | 5/2003 | Nagata et al. | |
| 6,559,567 B2 | 5/2003 | Schöb | |
| 6,559,637 B2 | 5/2003 | Miyata et al. | |
| 6,563,306 B2 | 5/2003 | Sato | |
| 6,573,088 B2 | 6/2003 | Gemmell et al. | 435/286.4 |
| 6,580,190 B2 | 6/2003 | Takasu | |
| 6,617,739 B1 | 9/2003 | Kinoshita | |
| 6,621,245 B2 | 9/2003 | Vaassen et al. | |
| 6,625,517 B1 | 9/2003 | Bogdanov | |
| 6,642,711 B2 | 11/2003 | Kawate | |
| 6,646,721 B2 | 11/2003 | Compter | |
| 6,650,079 B2 | 11/2003 | Binnard | |
| 6,661,220 B1 | 12/2003 | Glehr | |
| 6,690,159 B2 | 2/2004 | Burreson et al. | 701/300 |
| 6,691,074 B1 | 2/2004 | Moriya et al. | 702/190 |
| 6,698,737 B1 | 3/2004 | Blessing | |
| 6,707,200 B2 | 3/2004 | Carroll et al. | |
| 6,781,524 B1 | 8/2004 | Clark et al. | |
| 6,784,580 B2 | 8/2004 | Yashiro et al. | |
| 6,803,758 B1 | 10/2004 | Nicholson | |
| 6,809,450 B1 | 10/2004 | Morrison | 310/90.5 |
| 6,810,754 B2 | 11/2004 | May | |
| 6,813,543 B2 | 11/2004 | Aalund et al. | 700/245 |
| 6,864,955 B2 | 3/2005 | Nishi et al. | 355/53 |
| 6,876,896 B1 | 4/2005 | Ortiz et al. | |
| 6,877,963 B2 | 4/2005 | Beyer et al. | 417/365 |
| 6,878,044 B2 | 4/2005 | Sakurai et al. | 451/67 |
| 6,879,063 B2 | 4/2005 | Frissen et al. | |
| 6,879,076 B2 | 4/2005 | Long | |
| 6,909,281 B2 | 6/2005 | Gassman et al. | 324/207.24 |
| 6,917,136 B2 | 7/2005 | Thornton et al. | |
| 6,927,505 B2 | 8/2005 | Binnard et al. | |
| 6,940,274 B2 | 9/2005 | Wakiyama et al. | |
| 6,952,086 B1 | 10/2005 | Krefta et al. | |
| 6,967,424 B2 | 11/2005 | Popov | |
| 6,989,647 B1 | 1/2006 | Lee | |
| 6,991,710 B2 | 1/2006 | Harris et al. | 204/198 |
| 6,995,534 B2 | 2/2006 | Berroth et al. | |
| 7,005,847 B2 | 2/2006 | Gassman et al. | 324/207.25 |
| 7,023,118 B1 | 4/2006 | Morrison | 310/90.5 |
| 7,053,582 B2 | 5/2006 | Ueyama et al. | 318/632 |
| 7,067,952 B2 | 6/2006 | Neal | |
| 7,070,398 B2 | 7/2006 | Olsen et al. | 417/353 |
| 7,073,521 B2 | 7/2006 | Sakai | |
| 7,075,197 B2 | 7/2006 | Korenaga | |
| 7,087,143 B1 | 8/2006 | Schmidt et al. | 204/224 R |
| 7,115,066 B1 | 10/2006 | Lee | |
| 7,135,855 B2 | 11/2006 | Nyce | |
| 7,164,120 B2 | 1/2007 | Strasser | |
| 7,187,143 B2 | 3/2007 | Okada et al. | |
| 7,196,604 B2 | 3/2007 | Sills et al. | |

| | | |
|---|---|---|
| 7,205,741 B2 | 4/2007 | Simons et al. |
| 7,208,945 B2 | 4/2007 | Jones et al. |
| 7,211,918 B2 | 5/2007 | Migita et al. |
| 7,229,258 B2 | 6/2007 | Wood et al. |
| 7,230,355 B2 | 6/2007 | Lin et al. |
| 7,235,906 B2 | 6/2007 | Carroll et al. |
| RE39,748 E | 7/2007 | Watanabe et al. ............... 310/88 |
| 7,245,047 B2 | 7/2007 | Vreugdewater et al. |
| 7,246,985 B2 | 7/2007 | Ferrara ......................... 414/217 |
| 7,248,037 B2 | 7/2007 | Hara et al. |
| 7,262,527 B2 | 8/2007 | Neal |
| 7,264,430 B2 | 9/2007 | Bischof et al. |
| 7,292,656 B2 | 11/2007 | Kloper et al. |
| 7,325,559 B2 | 2/2008 | Darut et al. |
| 7,339,370 B2 | 3/2008 | Reimer et al. ............ 324/207.25 |
| 7,352,553 B2 | 4/2008 | Kozaki et al. |
| 7,359,032 B2 | 4/2008 | Dansberg et al. |
| 7,371,306 B2 | 5/2008 | Davis et al. ............... 156/345.22 |
| 7,400,141 B2 | 7/2008 | Taniguchi et al. |
| 7,467,930 B2 | 12/2008 | Ozaki et al. |
| 7,468,589 B2 | 12/2008 | Cox et al. |
| 7,508,099 B2 | 3/2009 | Korenaga et al. |
| 7,518,273 B2 | 4/2009 | Kataoka |
| 7,575,406 B2 | 8/2009 | Hofmeister et al. |
| 7,578,649 B2 | 8/2009 | Caveney et al. |
| 7,633,201 B2 | 12/2009 | Buhler et al. |
| 7,642,773 B2 | 1/2010 | Takahashi et al. |
| 7,795,861 B2 | 9/2010 | Englert et al. |
| 7,843,101 B2 | 11/2010 | Ito et al. |
| 7,868,610 B2 | 1/2011 | Velinsky et al. |
| 7,897,025 B2 | 3/2011 | Inoue et al. |
| 7,906,959 B2 | 3/2011 | Frachon et al. |
| 8,052,504 B2 | 11/2011 | Kalenian et al. |
| 8,104,488 B2 | 1/2012 | Rye et al. |
| 2002/0070617 A1 | 6/2002 | Kanebako ..................... 310/90.5 |
| 2002/0089324 A1 | 7/2002 | Miyata et al. ................ 324/207.2 |
| 2002/0097042 A1 | 7/2002 | Kawate et al. |
| 2002/0105241 A1 | 8/2002 | Carroll et al. |
| 2002/0135358 A1 | 9/2002 | Sager et al. |
| 2002/0149270 A1 | 10/2002 | Hazelton |
| 2003/0085676 A1 | 5/2003 | Binnard |
| 2003/0102721 A1 | 6/2003 | Ueta et al. |
| 2003/0102748 A1 | 6/2003 | Yashiro et al. ............... 310/90.5 |
| 2003/0183611 A1 | 10/2003 | Gregor et al. ................. 219/390 |
| 2004/0021437 A1 | 2/2004 | Maslov et al. |
| 2004/0070300 A1 | 4/2004 | Fu |
| 2004/0075426 A1 | 4/2004 | Wakiyama et al. |
| 2004/0217667 A1 | 11/2004 | Popov |
| 2005/0002743 A1 | 1/2005 | Moriya et al. ................. 406/198 |
| 2005/0089422 A1 | 4/2005 | Ozaki et al. .............. 417/423.12 |
| 2005/0135942 A1 | 6/2005 | Wood et al. .................... 417/348 |
| 2005/0136694 A1 | 6/2005 | Inoue et al. .................... 438/795 |
| 2005/0151544 A1 | 7/2005 | Mahoney et al. |
| 2005/0184689 A1 | 8/2005 | Maslov et al. |
| 2005/0188798 A1 | 9/2005 | Bischof et al. ................. 84/1.11 |
| 2005/0264119 A1 | 12/2005 | Carroll et al. |
| 2005/0265814 A1 | 12/2005 | Coady ....................... 414/744.5 |
| 2005/0269892 A1 | 12/2005 | Duff |
| 2006/0017340 A1 | 1/2006 | Kozaki et al. ................. 310/90.5 |
| 2006/0125473 A1 | 6/2006 | Frachon et al. .......... 324/207.26 |
| 2006/0205553 A1 | 9/2006 | Lee |
| 2006/0219275 A1 | 10/2006 | Weber et al. ................. 134/64 R |
| 2006/0238053 A1 | 10/2006 | Kascak et al. |
| 2006/0275155 A1 | 12/2006 | Thibodeau ................. 417/410.1 |
| 2006/0279149 A1 | 12/2006 | Asper .......................... 310/90.5 |
| 2007/0024138 A1 | 2/2007 | Buhler et al. ................. 310/90.5 |
| 2007/0120556 A1 | 5/2007 | Dufour et al. |
| 2007/0194787 A1 | 8/2007 | Takahashi et al. ............ 324/252 |
| 2007/0269986 A1 | 11/2007 | Kalenian et al. .............. 438/692 |
| 2007/0295089 A1 | 12/2007 | Velinsky et al. ........... 73/517.01 |
| 2007/0299625 A1 | 12/2007 | Englert et al. |
| 2008/0011334 A1 | 1/2008 | Rye et al. ..................... 134/95.1 |
| 2008/0067968 A1 | 3/2008 | Binnard et al. |
| 2008/0116881 A1 | 5/2008 | May ......................... 324/207.12 |
| 2008/0121064 A1 | 5/2008 | Todorov ..................... 74/490.04 |

FOREIGN PATENT DOCUMENTS

| | | |
|---|---|---|
| EP | 121084 A2 | 10/1984 |
| EP | 129731 | 1/1985 |
| EP | 414127 | 2/1991 |
| EP | 526903 | 2/1993 |
| EP | 0565746 | 10/1993 |
| EP | 641061 | 3/1995 |
| EP | 675824 A1 | 10/1995 |
| EP | 758157 | 2/1997 |
| EP | 760244 A1 | 3/1997 |
| EP | 816701 | 1/1998 |
| EP | 897476 A1 | 2/1999 |
| EP | 1052761 A2 | 11/2000 |
| EP | 1054498 A1 | 11/2000 |
| EP | 1114648 | 7/2001 |
| EP | 1176999 A1 | 2/2002 |
| EP | 1732011 | 12/2006 |
| GB | 1552874 | 9/1979 |
| GB | 2035622 | 6/1980 |
| JP | 60170702 | 9/1985 |
| JP | 61152304 | 7/1986 |
| JP | 1023468 | 1/1989 |
| JP | 1240268 | 9/1989 |
| JP | 3178747 A | 8/1991 |
| JP | 3276317 | 12/1991 |
| JP | 4209996 | 7/1992 |
| JP | 4308823 | 10/1992 |
| JP | 5130762 | 5/1993 |
| JP | 6213233 | 8/1994 |
| JP | 7012091 | 1/1995 |
| JP | 7131966 A | 5/1995 |
| JP | 8323505 | 12/1996 |
| JP | 10023781 | 1/1998 |
| WO | 1989012907 | 12/1989 |
| WO | WO9414653 A1 | 7/1994 |
| WO | 9742413 A1 | 11/1997 |
| WO | 9837335 | 8/1998 |
| WO | WO9904481 A1 | 1/1999 |
| WO | 0102721 | 1/2001 |
| WO | WO0102211 A1 | 1/2001 |
| WO | 0231372 | 4/2002 |
| WO | WO0241473 A1 | 5/2002 |
| WO | WO03029651 A2 | 4/2003 |
| WO | 2004098677 | 11/2004 |
| WO | 2005003565 | 1/2005 |
| WO | 2005030296 | 4/2005 |
| WO | WO2005114848 A1 | 12/2005 |
| WO | 2006010285 | 2/2006 |
| WO | 2006053384 | 5/2006 |
| WO | 2007068496 | 6/2007 |
| WO | 2008003943 | 4/2008 |

OTHER PUBLICATIONS

Static Torque Profiles of a Hybrid Stepper Motor Having Relative Eccentricity Between Stator and Rotor Axes, Rajagopal et al., May 15, 2003, pp. 8701-8703, vol. 93, No. 10, A.I.P., Journal of Applied Physics, United States.

Sinusoidal Shaft Position Encoder, Benarous et al., Mar. 31-Apr. 2, 2004, IEEE Conference Publication 2004, No. 498, pp. 132-136, IEEE International Conference on Power Electronics, Machines and Drives.

Sine-Cosine Rotation Sensor for 360 Degree Angle Measurement Sensors, Wereb, J.A., 1995, pp. 40-41, vol. 12, No. 11, Elweco, Inc., United States.

A New CMOS Hall Angular Position Sensor, Technisches Messen, Popovic et al., 2001, pp. 286-291, vol. 68, No. 6, Jun, Swiss Fed. Institute Tech., Lausanne, Switzerland.

A Novel Multi-DOF Precision Positioning Methodology Using Two-Axis Hall-Effect Sensors, Kawato et al., 2005 American Control Conference, Jun. 8-10, 2005, pp. 3042-3047, IEEE.

Coding of Shared Track Gray Encoder, Journal of Dynamic Systems, Yan et al., Measurement and Control, Sep., Vol. 122, pp. 573-576, ASME.

A New Two-Axis Magnetic Position Sensor, Schott et al., 2002, pp. 911-915, IEEE.

The Long-Range Scanning Stage: A Novel Platform for Scanned-Probe Microscopy, Precision Engineering—Journal of the International Societies for Precision Engineering and Nanotechnology, 2000, pp. 191-209, vol. 24, Elsevier Science, In., United States.

Chinese Office Action in CN Application No. 200880104585.4 dated Mar. 7, 2012.

Chinese Office Action in CN Application No. 200880104666.4 dated Aug. 18, 2011.

Chinese Office Action in CN Application No. 200880104585.4 dated Jan. 19, 2011.

Arreola, Rafael Becerril, Nonlinear Control design for a Magnetic Leviatation System, Thesis for Master of Applied Science, 2003, http://www.control.utoronto.ca/lab/references/Rafael_Becerril_03.pdf.

Arreola, Rafael Becerril, Output feedback nonlinear control for a linear motor in suspension mode, Automatica, 2004, Elsevier, 2004.

Carpenter, C.J. Electromagnetic induction in terms of Maxwell force instead of magnetic flux, Science, Measurement and Technology, IEE Proceedings, Jul. 1999, vol. 146, Issue 4, pp. 182-193. (abstract) IEEE [online] [retreived on Sep. 8, 2008] Retrieved from the Internet: <URL: http://ieeexplore.leee.org/xplifreeabs_all.jsp?tp=&arnum_ber-790323&isn u mber-17150>.

Cho et al., Analysis and design of synchronous permanent magnet planar motors, Cho et al., Power Engineering Review, Jul. 2002, vol. 22, pp. 52-52, IEEE.

Duan et al., Analysis and comparison of two-dimensional permanent magnet array for planar motor, Magnetics, IEEE Transactions, Nov. 2004, vol. 40, pp. 3490-3494.

Etxaniz et al., Design of Magnetically levitated 2D drive, COMPEL, 2006, vol. 25, pp. 732-740, Emerald Group Publishing Ltd.

Gallo, C.A., Halbach Magnetic Rotor Development, NASA Glenn Research Center, Report No. NASAITM-2008-215056; E-16281, Feb 2008, p. 27, CAS!.

Goa et al., A surface motor-driven planar motion stage integrated with an XYO(z) surface encoder for precision positioning, Precision Engineering Journal of the International Societies for Precision Engineering and Nanotechnology, 2004, vol. 28, pp. 329-337.

Jang et al., Design and analysis of helical motion permanent magnet motor with cylindrical Halbach array, IEEE Transactions, Sep. 2003, vol. 39, pp. 3007-3009.

Jansen et al., Magnetically levitated planar actuator with moving magnets, Ieee International Electric Machines and Drives Conference, 2007, pp. 272-278, IEEE.

Kim et al., Analysis and implementation of a tubular motor with Halbach magnetarray, Industry Application Conference, 1996, vol. 1, pp. 471-478, San Diego, CA, IEEE.

Kim et al., Design and Control of a 6-DOF High-Precision Integrated Positioner, Proceeding of the 2004 American Control Conference, Boston, Massachusetts, Jun. 30-Jul. 2, 2004, pp. 2493-2498, 2004, AACC.

Konkola et al., Electromagnetic design of a low-fringing-field magnetic bearing stage for electron beam lithography: Special issue on magnetic bearing, JSME international journal, Series C, Mechanical Systems, 2003, vol. 46, pp. 370-377.

Park et al., Analysis and Control of 2-D of Magnetic Levitation Stage Using Force Decoupling Theorem, SICE-ICASE, 2006, pp. 1091-1095.

Thornton et al., The MangeMotion Maglev System M3, TRB 2003 Annual Meeting CD-ROM, pp. 1-15, 2003.

International Preliminary Report on Patentability dated Aug. 12, 2009; Application PCT/US08/68682.

International Preliminary Report on Patentability dated Sep. 11, 2009; Application PCT/US08/68160.

International Preliminary Report on Patentability dated Sep. 22, 2009; Application PCT/US08/68167.

International Preliminary Report on Patentability dated Dec. 10, 2009; Application PCT/US08/68680.

International Preliminary Report on Patentability dated Jan. 5, 2010; Application PCT/US08/68684.

International Preliminary Report on Patentability dated Jan. 25, 2011; Application PCT/US08/68661.

* cited by examiner

| X OR Y-DIRECTION OF FORCE | | | | RESULTANT | | |
|---|---|---|---|---|---|---|
| TF1 | TF2 | TF3 | TF4 | Fx | Fy | TORQUE |
| + | 0 | 0 | 0 | + | 0 | + |
| + | 0 | + | 0 | ++ | 0 | 0 |
| + | 0 | − | 0 | 0 | 0 | ++ |
| − | 0 | 0 | 0 | − | 0 | − |
| − | 0 | − | 0 | − | 0 | 0 |
| − | 0 | + | 0 | 0 | 0 | − |
| + | + | − | − | 0 | 0 | ++++ |

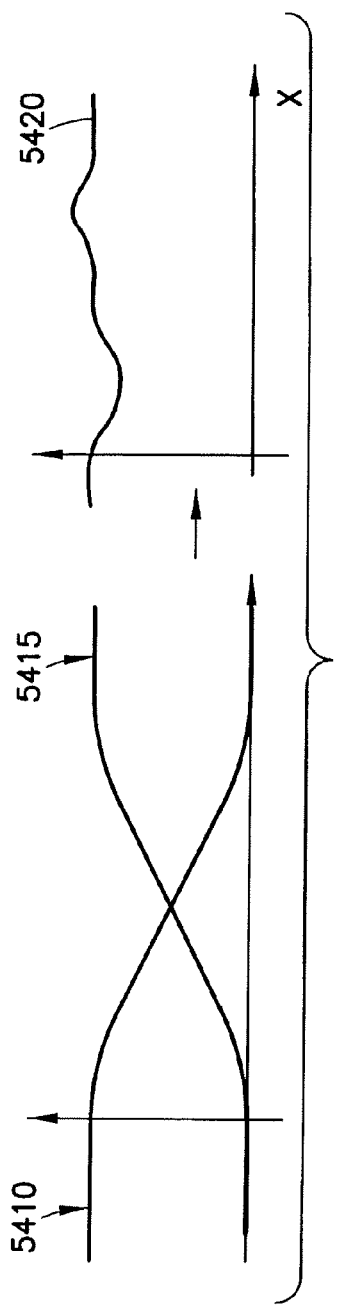
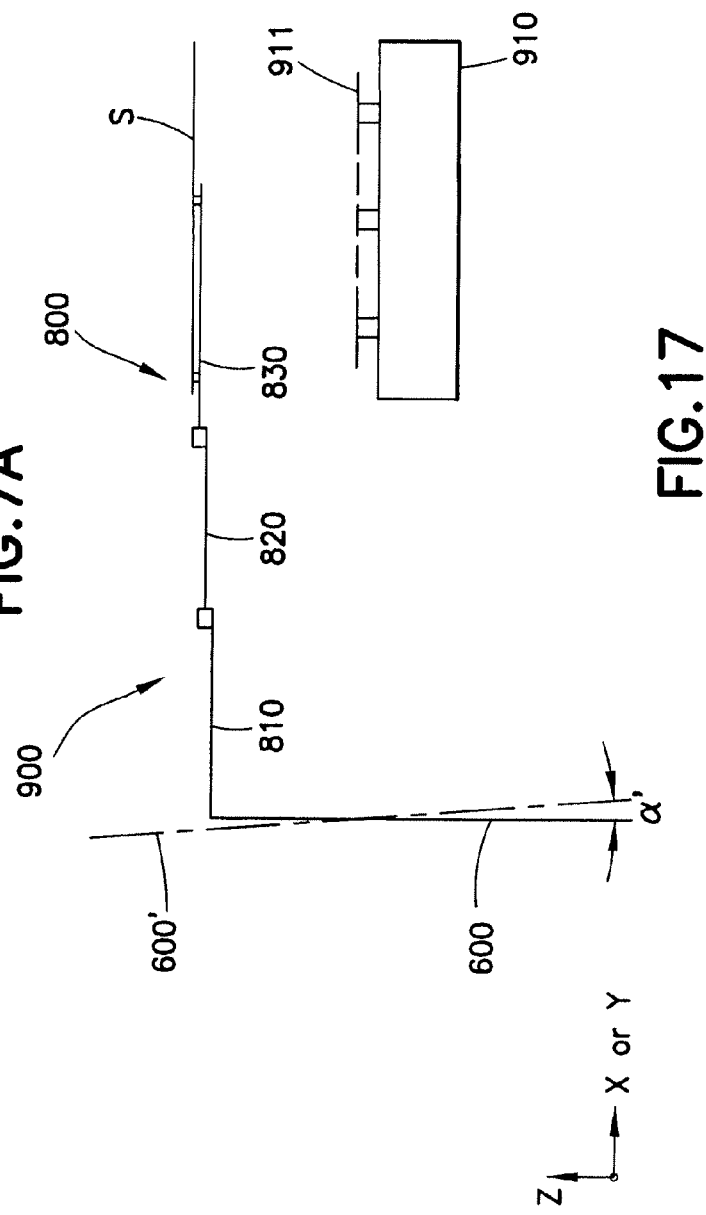

ROBOT DRIVE WITH MAGNETIC SPINDLE BEARINGS

CROSS-REFERENCE TO RELATED APPLICATION(S)

This application claims the benefit of U.S. Provisional Patent Application No. 60/946,687, filed on Jun. 27, 2007, the disclosure of which is incorporated by reference herein in its entirety.

BACKGROUND

1. Field

The present embodiments relate to robot drives and, more particularly, to robot drives with magnetic bearings.

2. Brief Description of Related Developments

Conventional robotic drives such as for example, drives for use in a vacuum environment, utilize ball or roller bearings in the vacuum or other controlled environment to support drive shafts of the robotic drive. The bearings supporting the drive shafts may employ various lubricants to prevent metal fatigue and bearing failure. Specially formulate low vapor pressure greases are generally used to lubricate the robot drive bearings in the vacuum or controlled environment.

However, the use of grease to lubricate the robot drive bearings is limited because the lubrication properties of the grease decrease as the vapor pressure and temperature decrease in the robots operating environment. The grease is also a possible source of contamination in a vacuum or other controlled environment due to, for example, outgassing. Further, the greases used in conventional robot drives may break down and can migrate out of the bearings with the potential for contaminating the processing environment and can possibly cause a malfunctioning of the motor feedback systems of the debris from the grease migrates onto the position feedback encoders.

It would be advantageous to have a robot drive system that employs a contactless bearing system, and hence avoiding use of grease or other lubrication of contact surfaces. It would also be advantageous to have a robot drive system that is capable of enhanced mobility without an increase in the number of motors powering the system.

BRIEF DESCRIPTION OF THE DRAWINGS

The foregoing aspects and other features of the disclosed embodiments are explained in the following description, taken in connection with the accompanying drawings, wherein:

FIG. 7A diagrammatically illustrates forces applied in the drive section of FIG. 7;

FIG. 17 is a schematic illustration of a substrate transport in accordance with an exemplary embodiment.

DETAILED DESCRIPTION OF THE EXEMPLARY EMBODIMENT(s)

Figure 1:
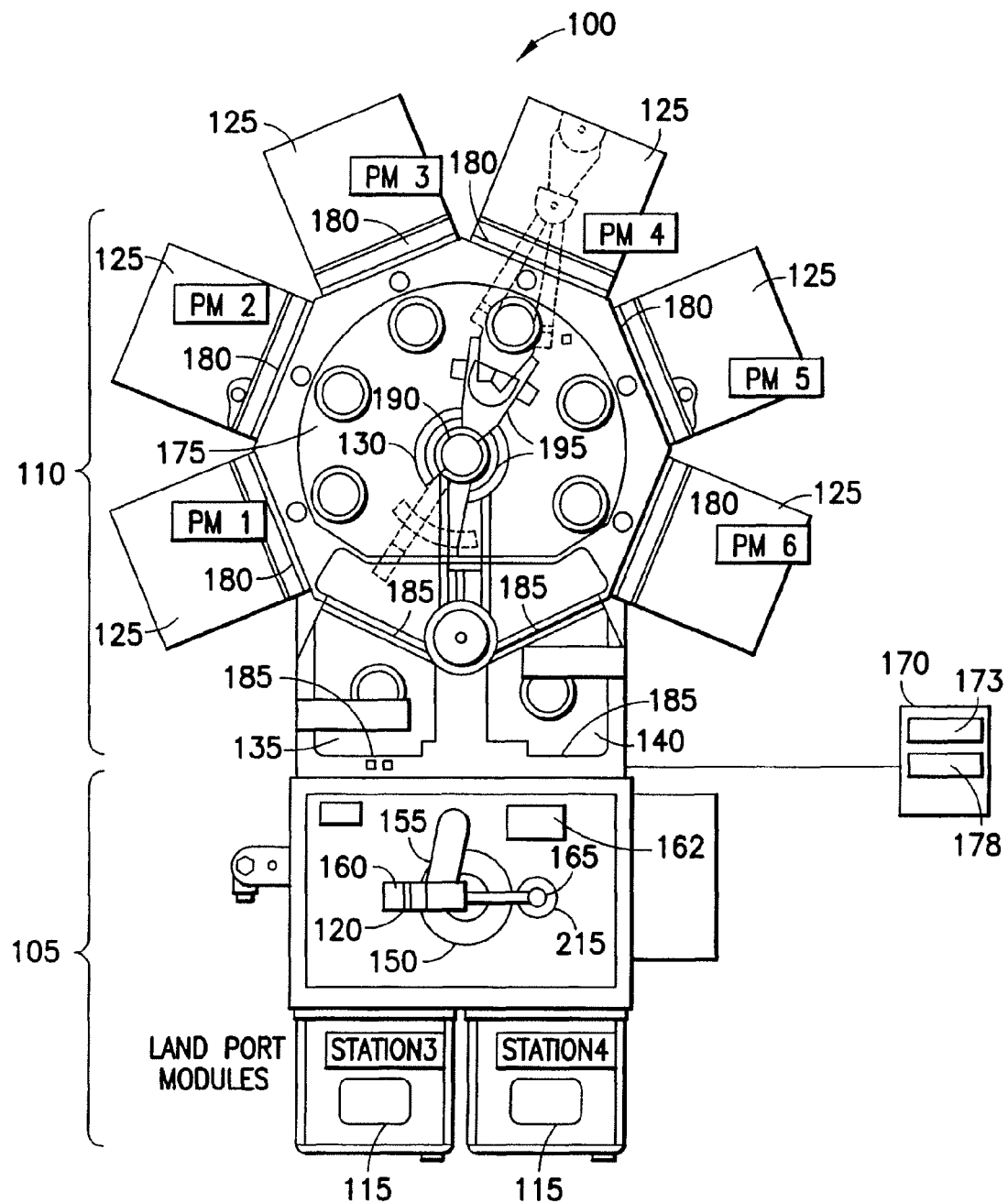
FIG. 1 is a schematic plan view of a substrate processing apparatus incorporating features in accordance with one exemplary embodiment.

FIG. 1 illustrates a perspective view of a substrate processing apparatus 100 incorporating features of the exemplary embodiments. Although the embodiments disclosed will be described with reference to the embodiments shown in the drawings, it should be understood that the embodiments disclosed can be embodied in many alternate forms. In addition, any suitable size, shape or type of elements or materials could be used.

The exemplary embodiments may increase the reliability and cleanliness and vacuum performance of a robotic drive that may be used to, for example, transport substrates, align substrates, or perform any other suitable function in any suitable environment including, but not limited to, atmospheric, vacuum or controlled environments. The robotic drives of the exemplary embodiments may include windings configured to magnetically support the motor spindle and to manipulate the spindle such that the spindle can be translated in, for example, a horizontal plane as well as be tilted with respect to, for example, a vertical plane. It is noted that the reference to the horizontal and vertical planes is merely for convenience and that the spindle may be translated and tilted, as will be described below, with respect to any suitable coordinate system. Though the exemplary embodiments described in detail below refer particularly to transport or positioning apparatus having articulated arms and rotary drives, the features of the exemplary embodiments are equally applicable to other equipment including, but not limited to, any other suitable transport or positioning system, any other device that rotates a substrate such as substrate aligners and any other suitable machines with rotary or linear drives.

The substrate processing apparatus 100 shown in FIG. 1 is a representative substrate processing tool incorporating features of the exemplary embodiments. In this example the processing apparatus 100 is shown as having a general batch processing tool configuration. In alternate embodiments, the tool may have any desired arrangement, for example the tool may be configured to perform single step processing of substrates. In other alternate embodiments, the substrate apparatus may be of any desired type such as sorter, stocker, metrology tool, etc. The substrates 215 processed in the apparatus 100 may be any suitable substrates including, but not limited to, liquid crystal display panels, semiconductor wafers, such as a 200 mm, 300 mm, 450 mm wafers or any other desired diameter substrate, any other type of substrate suitable for processing by substrate processing apparatus 100, a blank substrate, or an article having characteristics similar to a substrate, such as certain dimensions or a particular mass.

In this embodiment, apparatus 100 may generally have a front section 105, for example forming a mini-environment and an adjoining atmospherically isolatable section 110, which for example may be equipped to function as a vacuum chamber. In alternate embodiments, the atmosphere isolated section may hold an inert gas (e.g. $N_2$) or any other isolated and/or controlled atmosphere.

In the exemplary embodiment, front section 105 may generally have, for example one or more substrate holding cassettes 115, and a front end robot 120. The front section 105 may also, for example, have other stations or sections such as an aligner 162 or buffer located therein. Section 110 may have one or more processing modules 125, and a vacuum robot arm 130. The processing modules 125 may be of any type such as material deposition, etching, baking, polishing, ion implantation cleaning, etc. As may be realized the position of each module, with respect to a desired reference frame, such as the robot reference frame, may be registered with controller 170. Also, one or more of the modules may process the substrate(s) 215 with the substrate in a desired orientation, established for example using a fiducial (not shown) on the substrate. Desired orientation for substrate(s) in processing modules may also be registered in the controller 170. Vacuum section 110 may also have one or more intermediate chambers, referred to as load locks. The embodiment shown in FIG. 1 has two load locks, load lock A 135, and load lock B 140. Load locks A and B operate as interfaces, allowing substrates to pass between front section 105 and vacuum section 110 without violating the integrity of any vacuum that may be present in vacuum section 110. Substrate processing apparatus 100 generally includes a controller 170 that controls the operation of substrate processing apparatus 100. In one embodiment the controller may be part of a clustered control architecture as described in U.S. patent application Ser. No. 11/178,615, filed on Jul. 11, 2005, the disclosure of which is incorporated by reference herein in its entirety. In this example, controller 170 has a processor 173 and a memory 178. In addition to the information noted above, memory 178 may include programs including techniques for on-the-fly substrate eccentricity and misalignment detection and correction. Memory 178 may further include processing parameters, such as temperature and/or pressure of processing modules, and other portions or stations of sections 105, 110 of the apparatus, temporal information of the substrate(s) 215 being processed and metric information for the substrates, and program, such as algorithms, for applying this ephemeris data of apparatus and substrates to determine on the fly substrate eccentricity.

In the exemplary embodiment, front end robot 120, also referred to as an ATM (atmospheric) robot, may include a drive section 150 and one or more arms 155. At least one arm 155 may be mounted onto drive section 150. At least one arm 155 may be coupled to a wrist 160, which in turn is coupled to one or more end effector(s) 165 for holding one or more substrate(s) 215. End effector(s) 165 may be rotatably coupled to wrist 160. ATM robot 120 may be adapted to transport substrates to any location within front section 105. For example, ATM robot 120 may transport substrates among substrate holding cassettes 115, load lock A 135, and load lock B 140. ATM robot 120 may also transport substrates 215 to and from the aligner 162. Drive section 150 may receive commands from controller 170 and, in response, direct radial, circumferential, elevational, compound, and other motions of ATM robot 120.

In the exemplary embodiment, vacuum robot arm 130 may be mounted in central chamber 175 of section 110 (See FIG. 1). Controller 170 may operate to cycle openings 180, 185 and coordinate the operation of vacuum robot arm 130 for transporting substrates among processing modules 125, load lock A 135, and load lock B 140. Vacuum robot arm 130 may include a drive section 190 and one or more end effectors 195. In other embodiments, ATM robot 120 and vacuum robot arm 130 may be any suitable type of transport apparatus, including but not limited to, a SCARA-type robot, an articulating arm robot, a frog leg type apparatus, or a bi-symmetric transport apparatus.

Although the exemplary embodiments will be described herein with respect to a vacuum robot, such as for example robot 800 of FIG. 2, it should be realized that the exemplary embodiments can be employed in any suitable transport or other processing equipment (e.g. aligners, etc.) operating in any suitable environment including, but not limited to, atmospheric environments, controlled atmosphere environments and/or vacuum environments. It should also be realized that the transports incorporating aspects of the exemplary embodiments can have any suitable configuration including, but not limited to, the "frog leg" configuration of robot arm 130, the SCARA arm configuration of robot 120, an articulating arm robot or a bi-symmetric transport apparatus.

Figure 2:
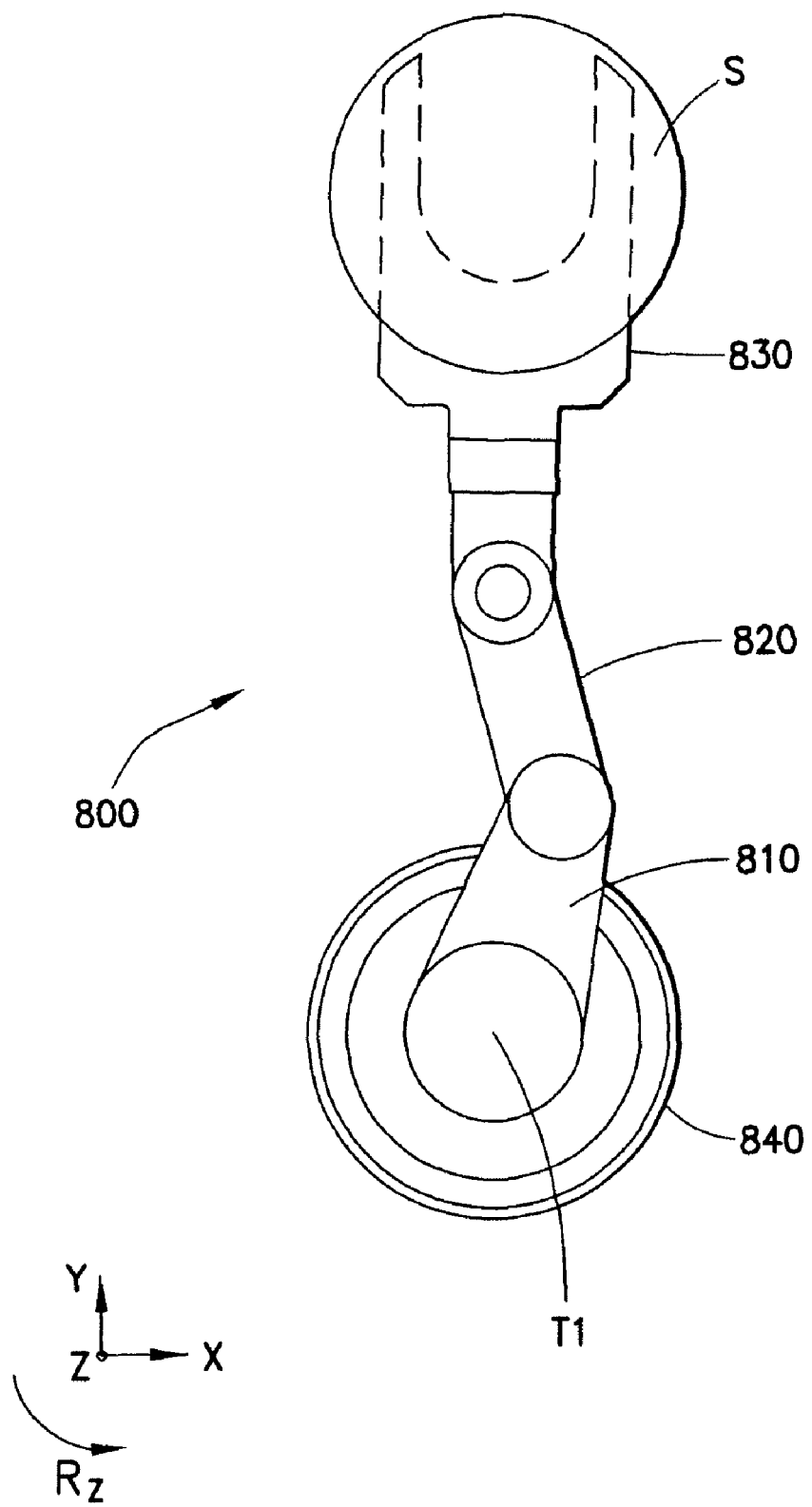
FIG. 2 shows an exemplary substrate transport incorporating features of an exemplary embodiment.
Figure 3:
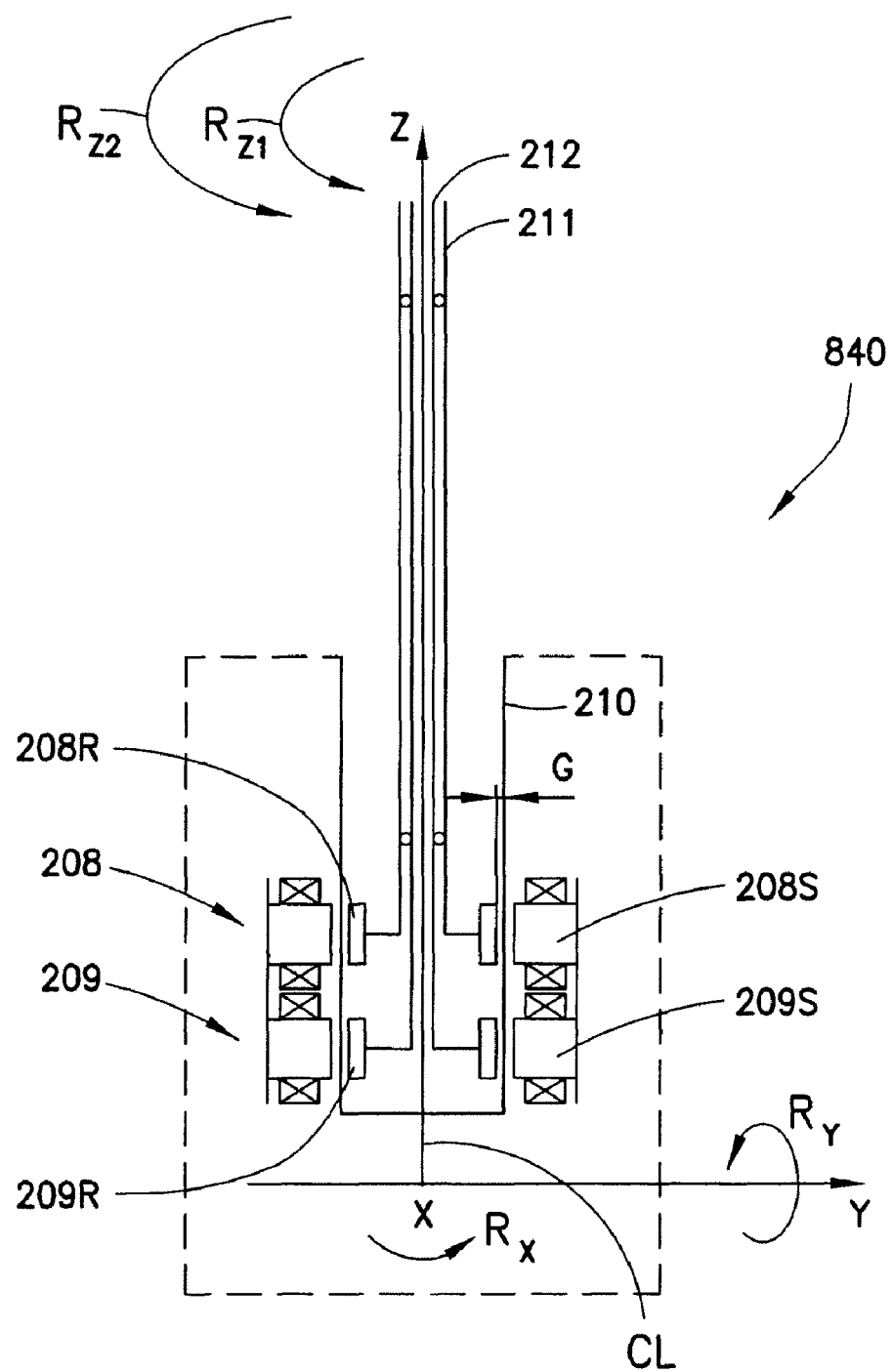
FIG. 3 is a schematic cross-sectional illustration of a substrate transport drive section in accordance with an exemplary embodiment.

An exemplary robot transport 800 is shown in FIG. 2. The transport may include at least one arm having an upper arm 810, a forearm 820 and at least one end effector 830. The end effector 830 may be rotatably coupled to the forearm 820 and the forearm 820 may be rotatably coupled to the upper arm 810. The upper arm 810 may be rotatably coupled to, for example the drive section 840 of the transport apparatus. For exemplary purposes only, the drive section 840 may include a coaxial drive shaft or spindle (See FIG. 3). In this example, as shown in FIG. 3, the coaxial shaft or spindle is shown having two drive shafts 211, 212 but in alternate embodiments the spindle may have more or less than two drive shafts. In other alternate embodiments the drive shafts may be non-coaxial or configured in, for example, a side by side arrangement. In still other alternate embodiments the drive shafts may have any suitable configuration. In this example, the outer shaft 211 of the coaxial drive shaft may be suitably coupled to upper arm 810 and the inner shaft 212 may be suitably coupled to the forearm 820. In this example the end effector 830 may be operated in a "slaved" configuration but in alternate embodiments an additional drive shaft may be included in the drive unit to operate the end effector 830. The drive section 840 may include two motors 208, 209, one motor for driving the outer shaft and the other motor for driving the inner shaft. The two motors 208, 209 may allow movement of the arm 800 such that the arm has at least two degrees of freedom (i.e. rotation about, for example, the Z-axis and extension in, for example the X-Y plane).

In operation, the arm 800 may be rotated about the Z-axis by energizing motor windings such that rotational torque Rz is applied to both inner and outer shafts 211, 212 of the coaxial spindle in the same direction (i.e. both shafts rotate in the same direction). The arm may be extended or retracted by, for example applying rotational torque Rz to the inner and outer shafts 212, 211 such that the inner and outer shafts 212, 211 rotate in opposite directions. As will be described below, the position of the arm may be fine tuned by controlling the center of rotation T1 of the inner and outer shafts. In accordance with an exemplary embodiment the inner and outer shafts 212, 211 of the coaxial spindle and the arm 800 may be supported by the magnetic bearings/motors as will be described below.

In accordance with an exemplary embodiment, magnetic bearings located in the drive section 840 of, for example the robotic transport 800 support axial and radial moment loads applied to one or more drive shaft(s) of the drive section for driving, for example, the arm links of the robot as will be described in greater detail below. One or more of the magnetic bearings supporting the drive shafts may be active, for example, the magnetic bearings may be configured with radial and axial gap control that may allow controlled motion of the drive shafts (and hence the transport end effector) so that the transport has more than two degrees of freedom from the two motors. For example, the drive section may provide, for exemplary purposes only, six or seven degrees of freedom in, for example, the X, Y and Z directions as well as Rx, Ry, Rz1 and Rz2 as will be described in greater detail below. In alternate embodiments the drive section may provide more or less than six or seven degrees of freedom. These multiple degrees of freedom, for example, may allow the active leveling and the fine tuning of a position/orientation (i.e. for substrate centering) of the arm and end effectors that are attached to the robot drive as will also be described in greater detail below.

In one exemplary embodiment, referring to FIG. 3, the drive section 840 of the transport may include first motor stator 208S and rotor 208R (which form a first motor 208) and a second motor stator 209S and rotor 209R (which form a second motor 209) and two coaxial shafts 211, 212. As may be realized, in alternate embodiments the coaxial shaft may have more or less than two drive shafts. In this example the centerline of the stators is located along the line CL shown in FIG. 3. Although the drive section 840 is shown as having two stators 208S, 209S it should be realized that the drive section may include any suitable number of stators for driving more or less than two shafts. The stators 208S, 209S may be isolated from the rotating assembly or spindle (i.e. the shafts, rotors and other motor components attached to the shafts) by, for example, any suitable boundary 210 which may be for example, a boundary of the housing of a processing chamber that separates the chamber atmosphere from an outside atmosphere. For example, the boundary 210 may allow the rotors 208R, 209R to operate in a vacuum while the stators 208S, 209S operate in an atmospheric environment. The boundary may be constructed of any suitable material for use in, for example, a vacuum environment and from material that can be interposed within magnetic fields without causing a flux short circuit or being susceptible to eddy currents and heating from magnetic interaction. The boundary may also be coupled to suitable heat transfer devices (e.g. passive or active) to minimize temperatures in the drive section. In this exemplary embodiment, the first motor rotor 208R may be coupled to the outer drive shaft 211 while the second motor rotor 209R may be coupled to the inner drive shaft 212. As can be seen in FIG. 3, the outer and inner drive shafts 211, 212 are concentric or coaxial drive shafts but in alternate embodiments the drive shafts may have any suitable configuration including, but not limited to, side-by-side or otherwise non-concentric configurations.

In accordance with one exemplary embodiment, the stators 208S, 209S and their respective rotors 208R, 209R may form self-bearing motors/magnetic spindle bearings that are configured to magnetically support their respective shafts 211, 212 (for example, radially and the Z-direction in the embodiment shown) and control at least a center of rotation of their respective shafts 211, 212. For example, the motors 208, 209 may include iron-core stators and rotors with permanent magnets and iron backings. In alternate embodiments the stators may include any suitable ferromagnetic material for interacting with the rotors. The relative position between the rotors 208R, 209R and the stators 208S, 209S along, for example, the Z-direction may be maintained substantially constant due to, for example, passive magnetic forces between the stators 208S, 209S and the rotors 208R, 209R. The passive magnetic forces between the stators 208S, 209S and the rotors 208R, 209R may also stabilize the Rx and Ry orientations of the rotors 208R, 209R about, for example, the X- and Y-axis. The motor windings may be configured to apply a torque Rz1 (for shaft 211), Rz2 (for shaft 212) to their respective rotors 208R, 209R for rotating the shafts 211, 212 and apply radial and/or tangential forces to control the center of rotation of the rotor in for example, the X and/or Y directions. By offsetting the X and/or Y positions of the two rotors 208E, 209R the spindle can be tilted as will be described below.

Figure 4A:
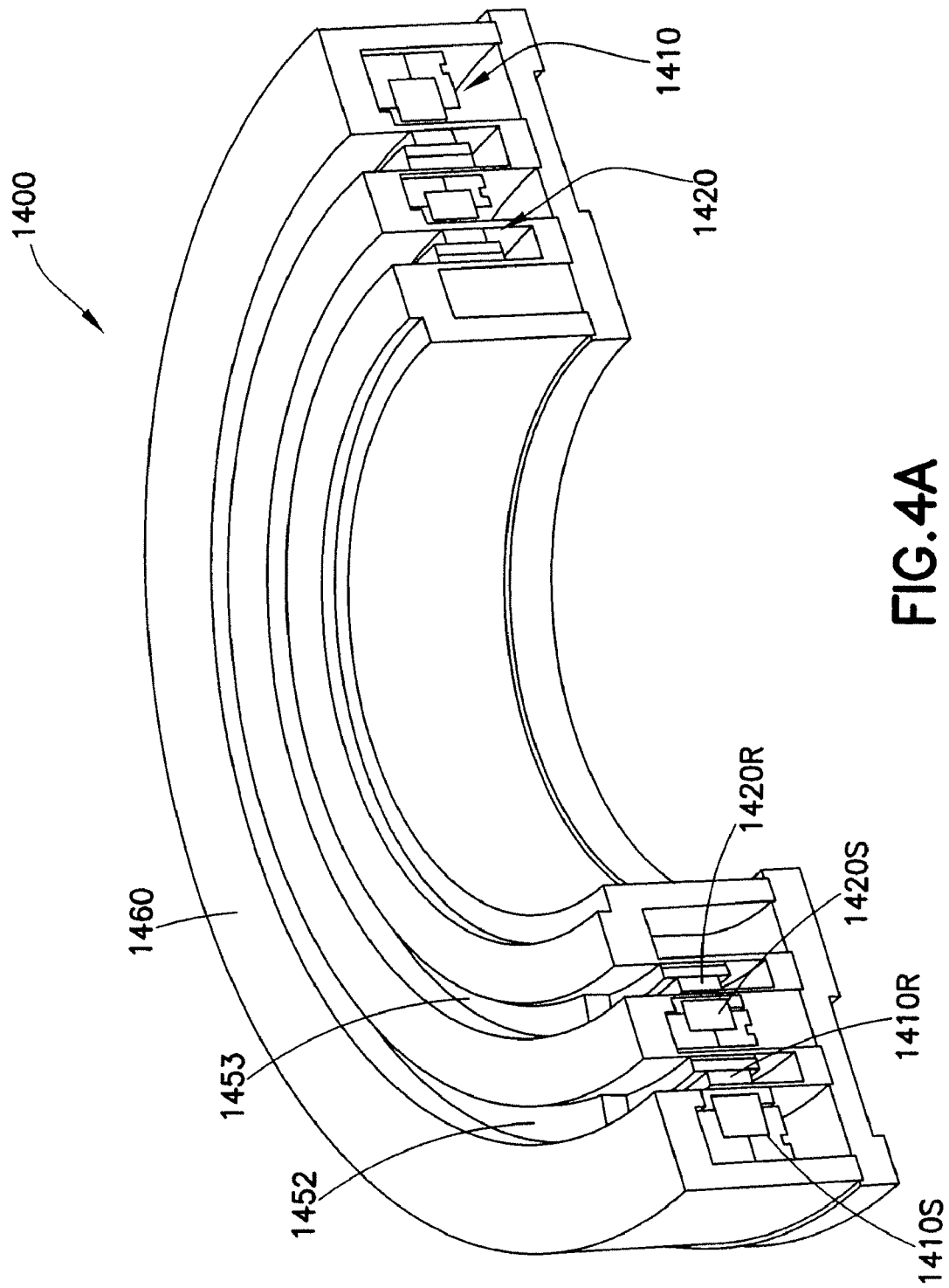
FIGS. 4A and 4B are schematic cross-sectional illustrations of a substrate transport drive section in accordance with an exemplary embodiment.
Figure 4B:
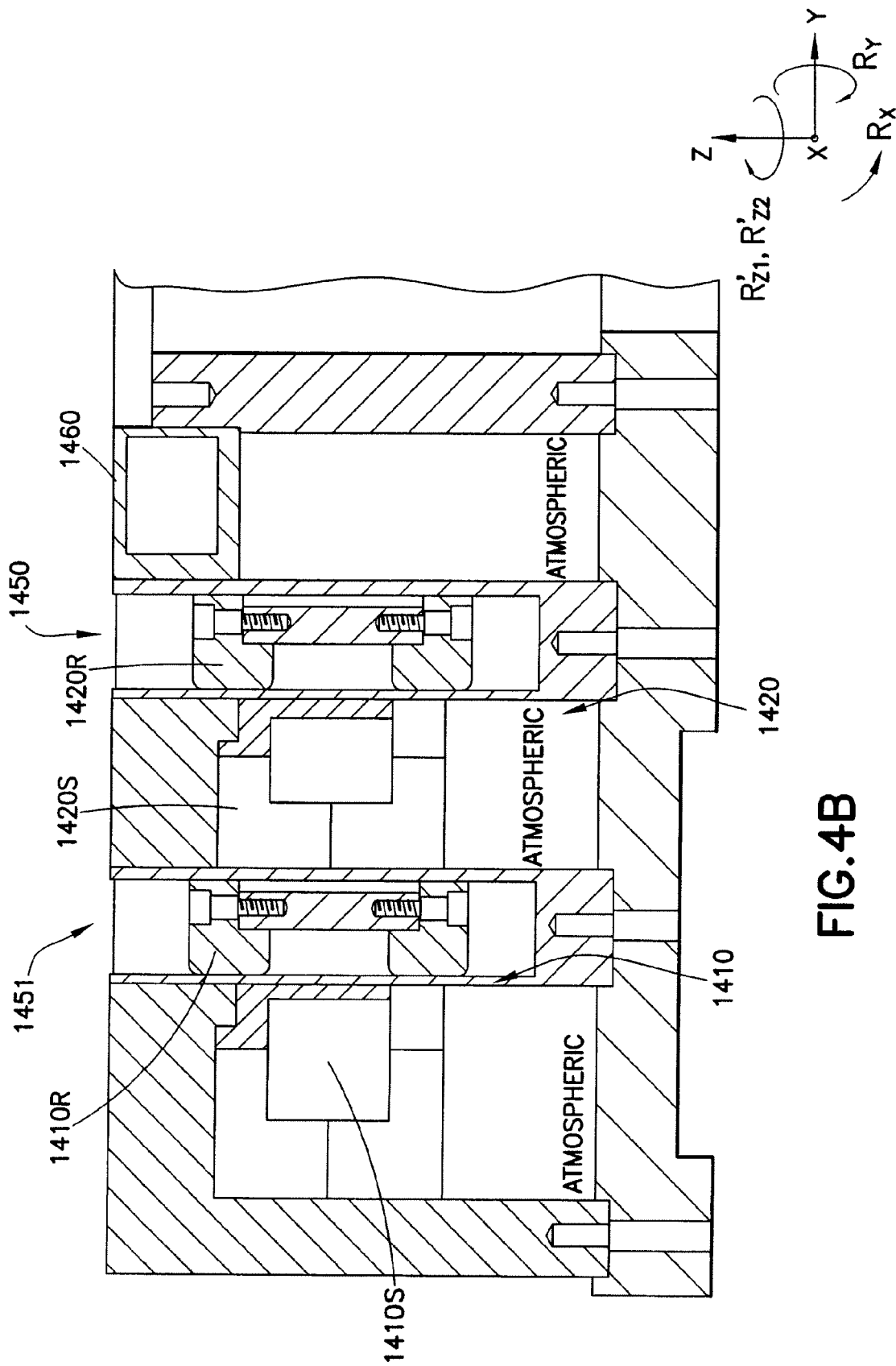

Referring now to FIGS. 4A and 4B, another exemplary coaxial drive that may be employed in, for example, drive section 840 of transport robot 800, is shown in accordance with an exemplary embodiment. In this exemplary embodiment the motors 1410, 1420 of the coaxial drive 1400 are located radially with respect to each other rather than axially as shown in FIG. 3. For example, the first motor 1410 may be located radially outward of the second motor 1420. In alternate embodiments, the motors 1410, 1420 may be arranged in an axial configuration (i.e. one above the other) or in any other suitable arrangement. In this exemplary embodiment, the first and second motors 1410, 1420 may respectively include stators 1410S, 1420S and rotors 1410R, 1420R that may be substantially similar to the rotors and stators described above with respect to FIG. 3. However, the rotors 1410R, 1420R in this exemplary embodiment may be respectively located within passageways 1451, 1450 formed by, for example a housing 1460. Respective rotary elements including, but not limited to shafts, pulleys and robotic arm sections may be attached or coupled to a respective rotor in any suitable manner through, for example, the openings of the passageways 1451, 1450. In a manner substantially similar to that described above with respect to FIG. 3, the relative position between the rotors 1410R, 1420R and the stators 1410S, 1420S along, for example, the Z-direction may be maintained substantially constant due to, for example, passive magnetic forces. In alternate embodiments, active magnetic forces may provide the relative positioning of the stators and rotors. The motor windings may also be configured to apply a torque Rz1' (for rotor 1410R), Rz2' (for rotor 1420R) and radial and/or tangential forces as described above for controlling the position of the X-Y planar position of the rotors. In alternate embodiments the motor may also be arranged to control as well as the tilt the rotors.

Figure 5:
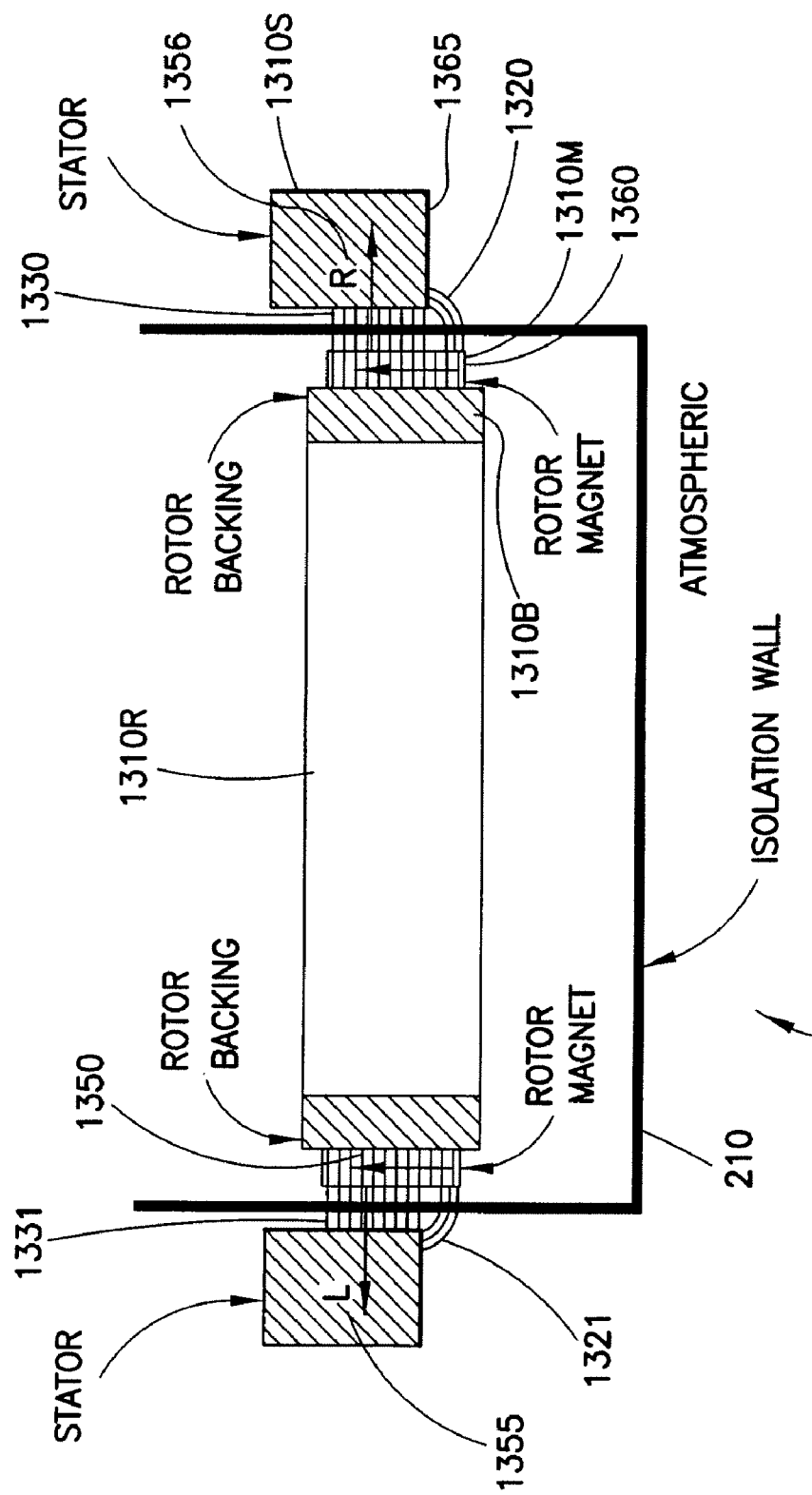
FIG. 5 is a schematic cross-sectional view of a portion of substrate transport drive section in accordance with an exemplary embodiment.

Referring now to FIG. 5 a schematic diagram of a self bearing motor 1300 that may be employed in, for example, drive section 840 of transport robot 800 is shown illustrating exemplary magnetic forces for controlling the rotor 1310R. A single rotor/stator is shown in FIG. 5 for exemplary purposes only and it should be realized that the motor 1300 may include any suitable number of rotors/stators having any suitable configuration including, but not limited to, the configuration described above with respect to FIGS. 3 and 4 or a side by side configuration. In the exemplary embodiment of FIG. 5, the stator 1310S may be substantially similar to the stators 208S, 209S described above. The rotor 1310R may also be substantially similar to rotors 208R, 209R described above where the rotor is constructed of, for example, a ferromagnetic material and may include permanent magnets 1310M and iron backings 1310B. In alternate embodiments the rotors may be constructed of any suitable material. In other alternate embodiments the permanent magnets may be replaced with any suitable ferromagnetic material for interacting with the stator. The rotor magnet 1310M may include an array of magnets having alternating polarities mounted around a periphery of the rotor. The periphery of the rotor may be an internal peripheral wall or an external peripheral wall of the rotor. In alternate embodiments the magnet 1310M may be embedded within the rotor. In other alternate embodiments, the magnets 1310M may be located at any suitable location on or in the rotor. The stator 1310S includes windings sets as will be described in greater detail bellow which when energized drive the rotor 1310R rotationally, radially and/or axially. In this exemplary embodiment the stator 1310S may be constructed of a ferromagnetic material suitable for interacting with the rotor 1310R, but in alternate embodiments the stator 1310S may be constructed of any suitable material. The interaction between the stator 1310S and the rotor magnets 1301M may produce passive forces in the direction of arrow 1350 that passively levitate the rotor 1310R. The levitation force may be a result of the curved magnetic flux lines 1320, 1321 which in turn may be generated by, for example, an offset of an edge 1360 of the rotor magnet 1310M relative to the an edge of the stator 1365. In alternate embodiments the levitational forces may be generated in any suitable manner. The passive levitational forces may generate a stable equilibrium condition along the axial and tilt directions of the rotor 1310R. Radial or attractive forces may be generated as a result of the magnetic flux lines 1330 in the directions of for example, arrows 1355, 1356. These attractive forces may create an unstable condition such that the windings may be energized to actively center and/or position the rotor 1310R radially to maintain the geometric center of the rotor/axis of rotation at a desired location.

Referring now to FIGS. 6A-6G, exemplary schematic illustrations of the motor 208 are shown in three different configurations in accordance with different embodiments. As may be realized, the motor 209 may be substantially similar to motor 208. The stator 208S may include windings that provide forces (e.g. tangential, radial or any combination thereof) for applying torque and rotating the rotor 208R as well as to provide radial positioning forces in order to actively control the center of rotation C of the rotor 208R. In the exemplary embodiments, the motor 208 may be arranged in winding segments where each segment may be driven as desired with any suitable number of electrical phases by, for example, controller 170 to produce independently controllable torque, and bearing forces simultaneously. For exemplary purposes only each winding set may be a segment of a three phase brushless DC motor. In alternate embodiments the winding segments may be part of any suitable AC or DC powered motor. One example of such a motor configuration is described in the commonly assigned U.S. patent application Ser. No. 11/769,651, entitled "REDUCED-COMPLEXITY SELF-BEARING BRUSHLESS DC MOTOR", filed on Jun. 27, 2007, the disclosure of which is incorporated by reference herein in its entirety.

Figure 6A:
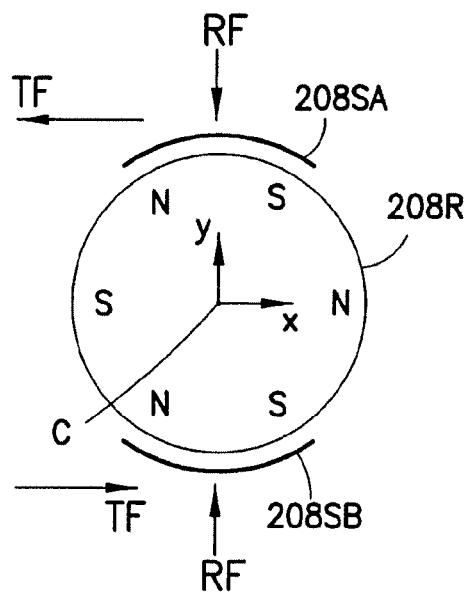
FIGS. 6A-6F are schematic illustrations of a portion of the substrate transport drive respectively in accordance with different exemplary embodiments.

In the exemplary embodiment shown in FIG. 6A, the stator 208S may include two pairs of winding sets 208SA, 208SB, that are positioned to form any desired mechanical angle between the winding sets and may have a suitably corresponding electrical angle shift therebetween to form the self bearing motor in cooperation with the respective shaft rotor 208R. In the example shown, the rotor 208R may have a permanent magnet array for example purposes only, though in alternate embodiments, the rotor 208R may not have permanent magnets and be formed from, for example, ferromagnetic material or have a ferromagnetic material attached to the rotor 208R in lieu of the permanent magnets. As can be seen in FIG. 6A, the winding sets 208SA, 208SB may be located about one-hundred-eighty degrees apart from each other. In alternate embodiments, the mechanical angle may be any suitable angle and is shown in FIG. 6A as being about one-hundred eighty degrees for exemplary purposes only. Also in the exemplary embodiment, the electrical angle between winding sets may be formed as desired to produce the radial or tangential forces for rotating and/or positioning the spindle to which the rotor(s) 208R are attached. The windings 208SA, 208SB and the rotor 208R may be configured and energized to produce radial and/or tangential forces so that the center of rotation C of the rotor 208R may be adjusted along, for example, a linear path or any other desired path. For example, by varying the magnitudes of the radial forces RF generated by the windings 208SA, 208SB in, for example, the Y-direction the rotor 208R may be moved along the Y-axis. Likewise, for example, by varying the tangential forces TF produced by each of the windings 208SA, 208SB the rotor 208R may be displaced in, for example the X-direction as will be described in greater detail below. It is noted that the directions of motion of the rotor's center of rotation C and the direction of the forces RF, TF are described herein for exemplary purposes only and the direction of motion of the rotor in the X-Y plane and the direction of the forces TF, RF may be in any suitable directions. As may be realized the radial and tangential forces may be decoupled from one another such that the forces may be generated simultaneously for the positioning and/or rotation of the rotor 208R. As also may be realized the resultant forces produced by the windings 208SA, 208SB may keep the rotor 208R centered in, for example the X-Y plane. In alternate embodiments the motors described herein may be commutated in any suitable manner such that the radial and/or tangential forces displace the rotor in any suitable direction in the X-Y plane.

Figure 6C:
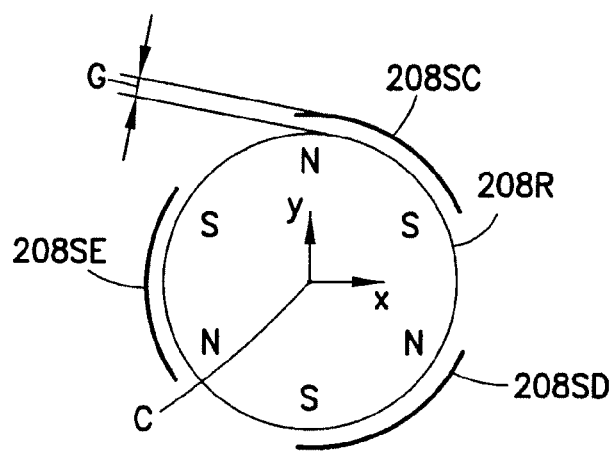
Figure 6D:
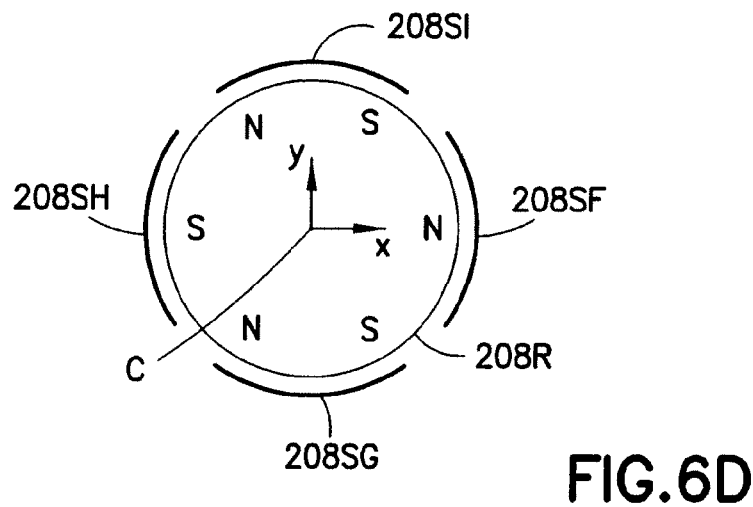
Figure 6B:
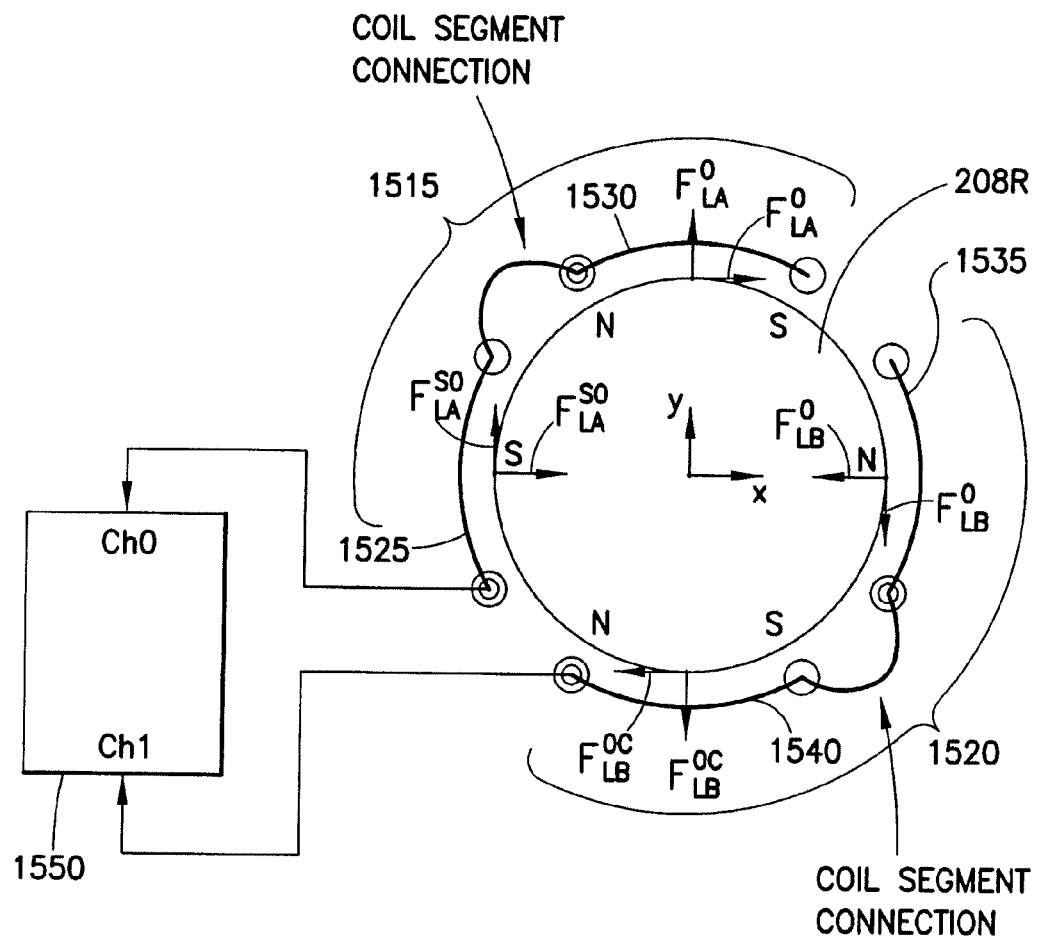

Referring now to FIG. 6B another exemplary embodiment is shown utilizing two winding sets 1515, 1520, where each winding set is arranged for example as two winding subsets 1525, 1530 and 1535, 1540 respectively. The winding sets 1515, 1520 may be driven by a current amplifier 1550 which may include software, hardware, or a combination of software and hardware suitable for driving the winding sets 1515, 1520. The current amplifier 1550 may also include a processor, a commutation function and a current loop function for driving the winding sets. In one embodiment the current amplifier 1550 may be included in any suitable controller such as, for example, controller 170. In alternate embodiments the current amplifier 1550 may be located in any suitable location. The commutation function may determine current for one or more windings 1525, 1530 and 1535, 1540 of each winding set 1515, 1520 according to a set of specified functions, while the current loop function may provide a feedback and driving capability for maintaining the current through the windings as determined. The processor, commutation function, and current loop function may also include circuitry for receiving feedback from one or more sensors or sensor systems that provide position information.

The two winding subsets 1525, 1530 and 1535, 1540 in each winding set 1515, 1520 respectively of FIG. 6B are coupled electrically and shifted with respect to each other by about ninety electrical degrees. As a result, when one of the two winding sets in the pair produces pure tangential force the other winding set in the pair generates pure radial force, and vice versa. In this embodiment, winding set 1515 has two sections 1530 and 1525, and winding set 1520 has two sections 1540 and 1535. Exemplary relationships for the desired torque (T) and centering forces ($F_x$) along the x-axis and ($F_y$) along the y-axis for the segmented winding sets 1515, 1520 of the embodiment of FIG. 6B utilizing, for example, Lorentz forces are described in the U.S. patent application Ser. No. 11/769,651, entitled "REDUCED-COMPLEXITY SELF-BEARING BRUSHLESS DC MOTOR", previously incorporated by reference. As may be realized, while winding subsets 1525, 1530, 1535, 1540 are shown offset by about ninety degrees it should be understood that other offsets that are more or less than about ninety degrees may also be utilized.

In the exemplary embodiment shown in FIG. 6C, the stator may include three winding sets 208SC, 208SD, 208SE extending over three sectors of the rotor 208R. In this example, the winding sets are spaced about one-hundred-twenty degrees apart from each other for exemplary purposes only. In alternate embodiments the three winding sets may have any suitable mechanical angular relationship, that may be more or less than about one-hundred-twenty degrees, for stably supporting the rotor 208R (and shaft 211) with the resultant forces generated by the winding sets 208SC, 208SD, 208SE. As noted above, the winding sets 208SC, 208SD, 208SE may also have a suitably corresponding electrical angle shift therebetween to form the self bearing motor in cooperation with the respective shaft rotor 208R. In the example shown, the rotor 208R may be substantially similar to that described above with respect to FIG. 6A. As may be realized, in this exemplary embodiment the windings 208SC, 208SD, 208SE may be configured and energized to produce radial, tangential and/or axial forces such that the center of rotation C of the rotor 208R may be moved to any point in, for example, the X-Y plane and is not limited to linear movement along a single axis as described above. It is noted that the movement of the center of rotation C of the rotor 208S may be limited only by the air gap G between a respective one of the windings 208SC, 208SD, 208SE and the rotor 208R.

In another exemplary embodiment as can be seen in FIG. 6D the stator 208S may include four winding sets 208SF, 208SG, 208SH, 208SI extending over four sectors of the rotor 208R. In this example the winding sets 208SF, 208SG, 208SH, 208SI are shown as being separated by, for example, an angle of about ninety-degrees for exemplary purposes only. In alternate embodiments the four winding sets may have any suitable mechanical angular relationship, that may be more or less than about ninety degrees, for stably supporting the rotor 208R (and shaft 211) with the resultant forces generated by the winding sets. As noted above, the winding sets 208SF, 208SG, 208SH, 208SI may also have a suitably corresponding electrical angle shift therebetween to form the self bearing motor in cooperation with the respective shaft rotor 208R. In the example shown, the rotor 208R may be substantially similar to that described above with respect to FIG. 6A. As noted above, the windings 208SF, 208SG, 208SH, 208SI may be configured and energized to produce radial and/or tangential forces such that the center of rotation C of the rotor 208R may be moved to any point in, for example, the X-Y plane and is not limited to linear movement along a single axis where the motion of the center of rotation C of the rotor 208S may be limited only by the air gap G between a respective one of the windings and the rotor.

Figure 6E:
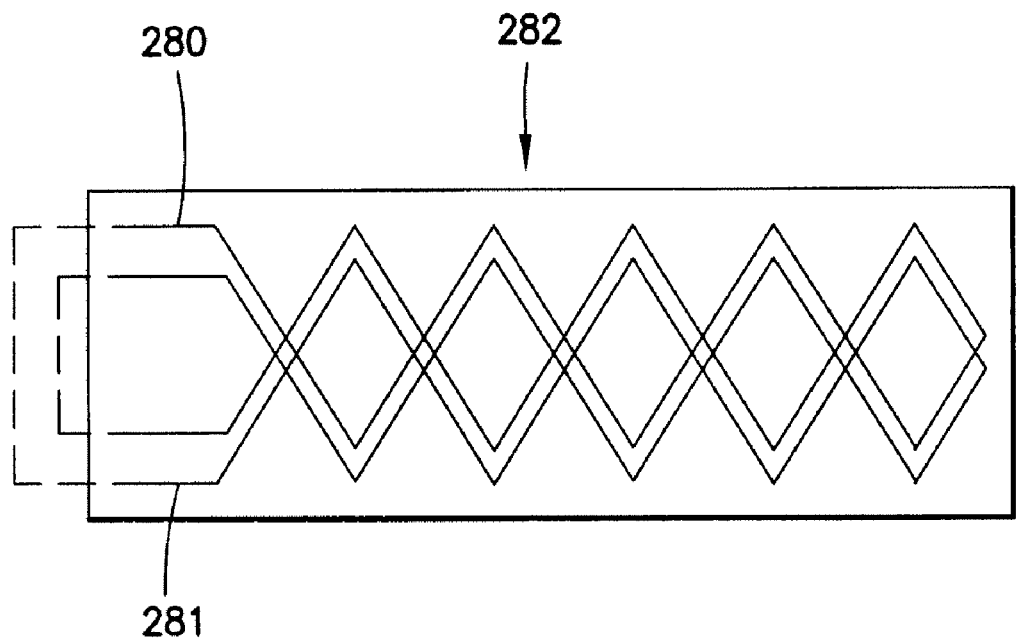
Figure 6F:
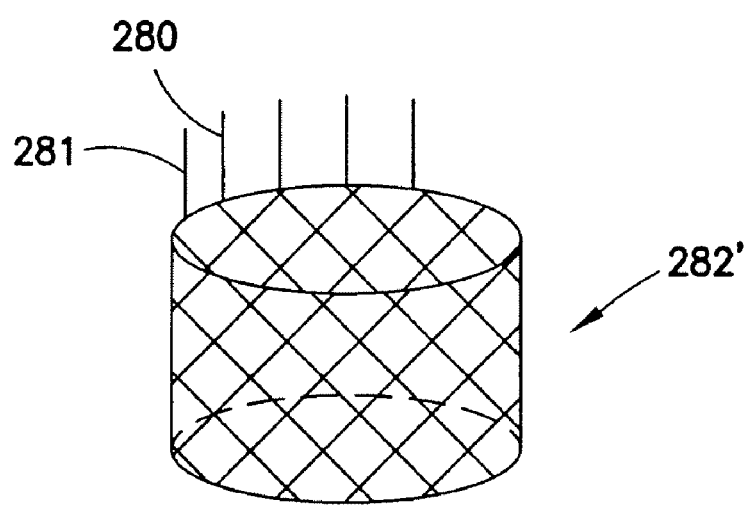

As may be realized, each of the winding segments described above in FIGS. 6A-6D may include any suitable number of circuits for generating the forces for manipulating the rotor 208R. For example, as can be seen in FIGS. 6E and 6F, one phase of a winding that may have, for example, two circuits 280, 281 with a zig-zag configuration is shown for exemplary purposes only. In the exemplary winding configuration shown in FIG. 6E energizing the circuits 280, 281 such that the current in circuit 280 is greater than that of circuit 281 produces a resultant force in for example the direction of arrow 282 and vice versa. As may be realized the circuits 280, 281 may have a cylindrical configuration as can be seen in FIG. 6F so that rotary forces 282' may also be applied to, for example, the rotor 208R. One example of motors including multiple circuit windings is described in United States Patent Publication 2005/0264119 the disclosure of which is incorporated by reference herein in its entirety.

Figure 6G:
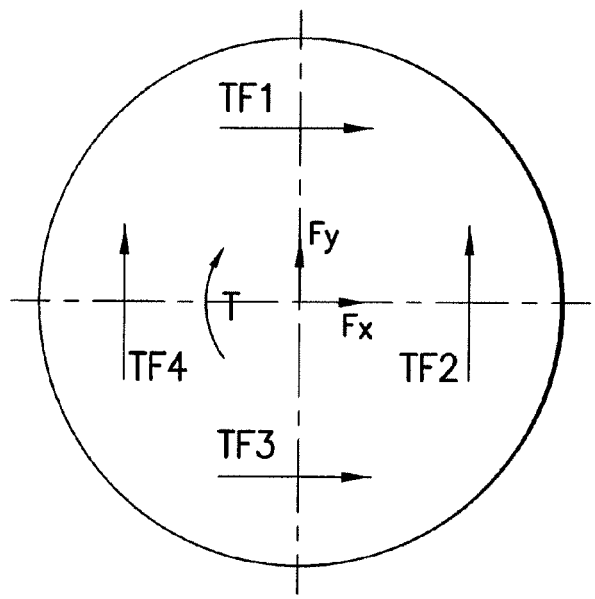
FIG. 6G illustrates and chart of forces applied in accordance with an exemplary embodiment.

FIG. 6G illustrates another exemplary embodiment where the tangential forces TF1-TF4 generated by the motor winding segments are varied for controlling the movement of the rotor. It is noted that in the chart shown in FIG. 6G, each "+" or "−" sign represents a force with a magnitude of one unit but that the tangential forces may be applied to produce suitable resultant differential forces for radially positioning the rotor. The signs shown in the chart of FIG. 6G represent the direction of the force or torque, not the value. As may be realized, by varying the resulting differential tangential forces generated by the winding sets the radial positioning of a respective rotor may be effected for the fine positioning of the end effector or the tilting of the spindle as described herein. One example of utilizing tangential forces for centering purposes is described in U.S. Pat. No. 6,707,200, the disclosure of which is incorporated by reference herein in its entirety.

Although the motors 208, 209 described above with respect to FIGS. 6A-6G are shown with two, three or four winding sets, it should be realized that the motors 208, 209 may have any suitable number of winding sets. It is also noted that while the motors 208, 209 are described above as being self-bearing motors where a set of windings may provide levitation, rotation, axial positioning and planar positioning of the rotor, it should also be realized that separate or distinct magnetic bearings (e.g. windings dedicated to providing some active bearing either alone or in combination with passive permanent magnets) may be provided with or apart from the rotors and stators of the motors for magnetically supporting the rotors and their respective shafts where the separate magnetic bearings are utilized to control, for example, the position of the rotors. In still other alternate embodiments, the rotors and shafts may be controllably supported in any suitable manner such as by any suitable actuators.

Figure 7:
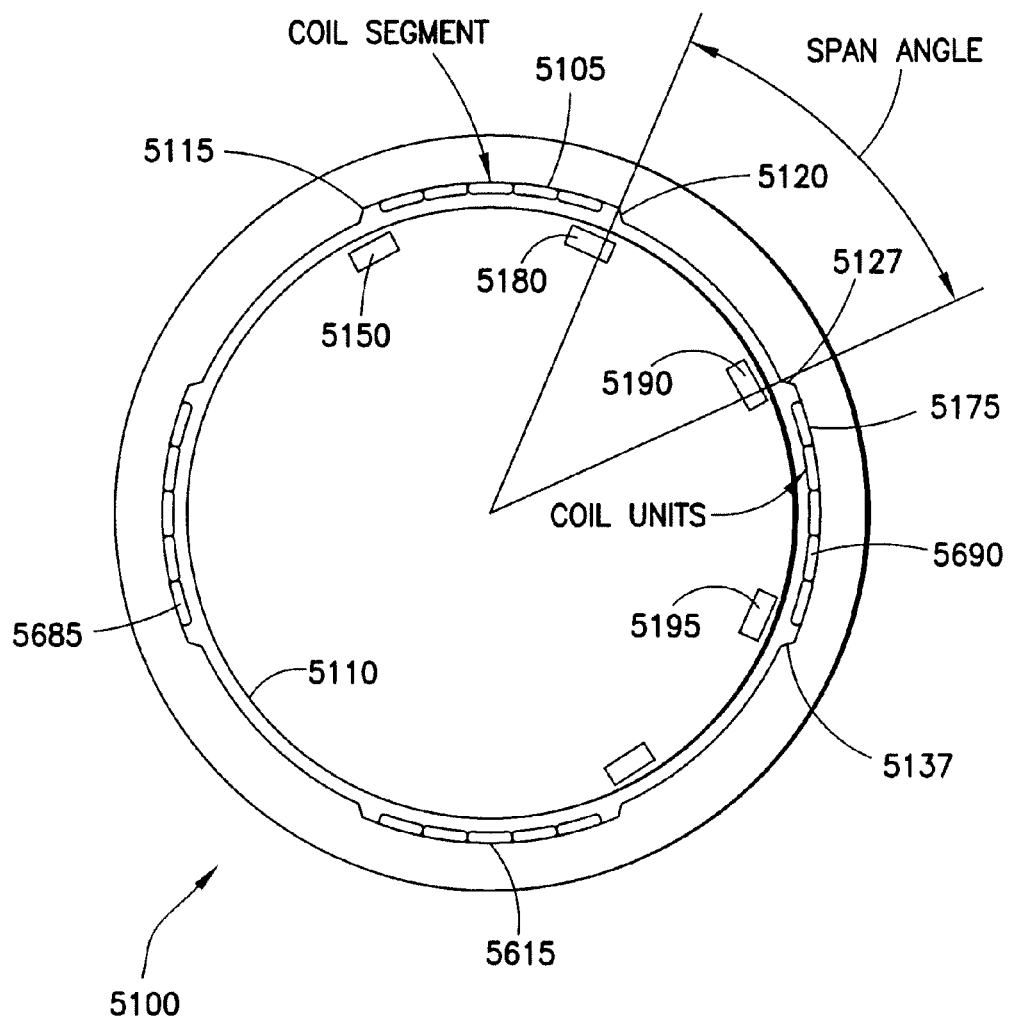
FIG. 7 is a schematic illustration of a portion of a drive section in accordance with an exemplary embodiment.
Figure 8:
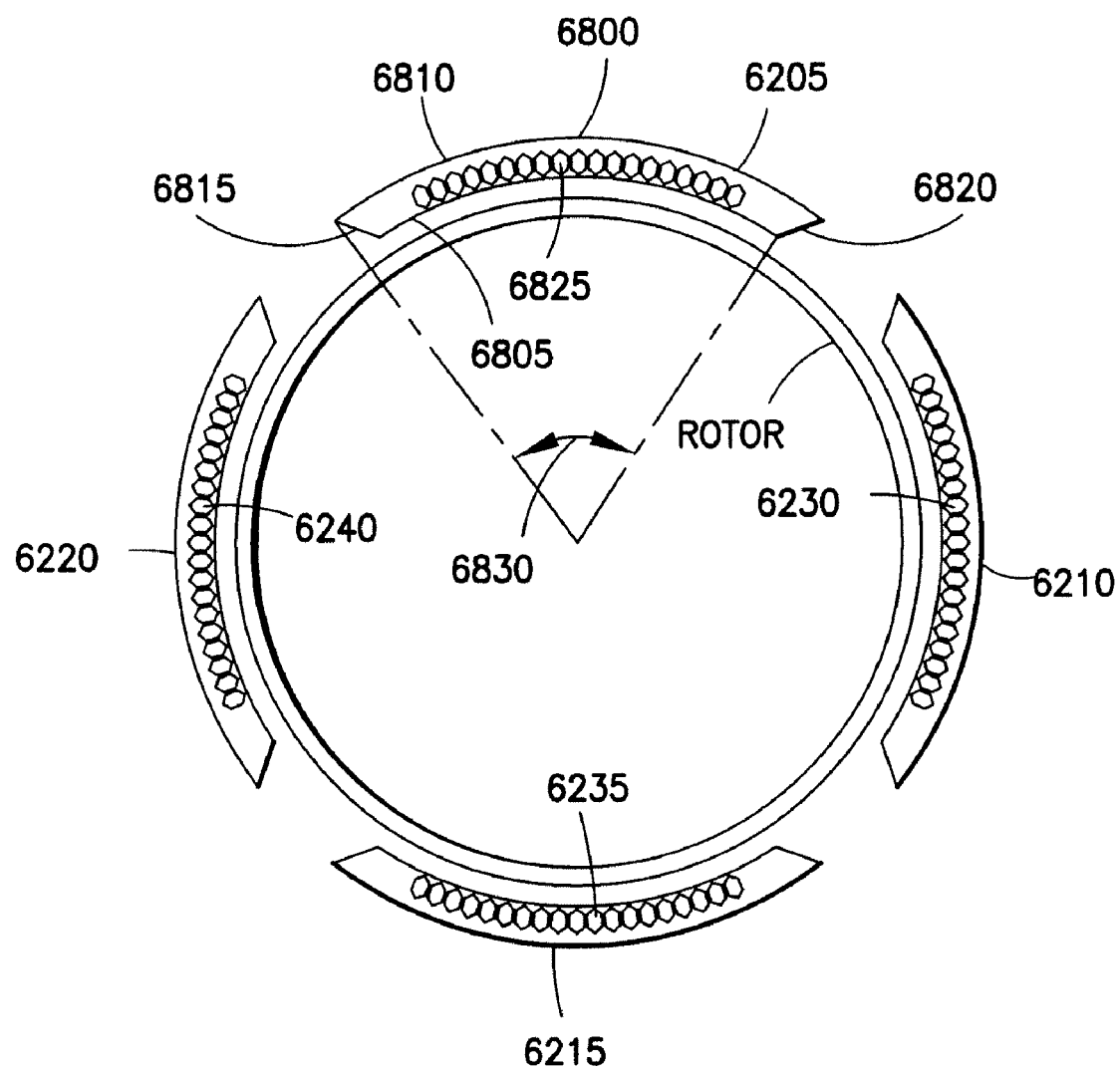
FIG. 8 is a schematic illustration of a portion of a transport drive section in accordance with an exemplary embodiment.

Referring now to FIGS. 7, 7A and 8, the drive sections of the exemplary embodiments, such as drive section 840 of transport robot 800, may also be configured to produce a desired amount of axial and tilt stiffness, and include anti-cogging elements to minimize cogging disturbances along a number of axes, while producing a desired amount of force across the air gap G (See FIG. 3), including planar positioning forces (e.g. radial forces) for positioning the rotor as described herein. In one embodiment the anti-cogging elements may be embodied in or incorporated as part of the stators of the motor. In other embodiments the anti-cogging elements may be separate from the stators. The anti-cogging elements may allow for the superposition of the cogging forces caused by each anti-cogging element component such that the overall cogging disturbance along propulsion, gap and axial directions is minimized. One suitable motor including anti-cogging elements is described in U.S. Patent Application entitled "MOTOR STATOR WITH LIFT CAPABILITY AND REDUCED COGGING CHARACTERISTICS", Ser. No. 12/163,993, filed on Jun. 27, 2008, the disclosure of which is incorporated by reference herein in its entirety.

The exemplary stator 5100 for a rotary motor shown in FIG. 7 may be configured for desired passive axial and tilt stiffness while reducing or minimizing cogging effects. The stator 5100 may include two or more recesses 5105, 5175 (and 5615, 5685) that extend inward from a first surface 5110 of the stator 5100. In the exemplary embodiment, the recesses may be configured to result in negligible effect on the passive axial and tilt stiffness of the motor. Each recess may include two transition areas from the first surface to the recess. For example, recess 5105 may include first and second transition areas 5115, 5120, respectively, between the first surface 5110 and the recess 5105. The transition areas may be configured as desired, suitable examples are described in U.S. Patent Application entitled "MOTOR STATOR WITH LIFT CAPABILITY AND REDUCED COGGING CHARACTERISTICS", previously incorporated by reference, to act on the rotor permanent magnets 5150, 5180 and generate anti-cogging forces upon the rotor to minimize rotor cogging. Similarly, recess 5175 may include first and second transition areas 5127, 5137, respectively, between the first surface 5110 and the recess 5175. Similar to the transition areas of the first recess, the transition areas 5127, 5137 of the second recess (or anti-cogging section of the stator) may be suitably shaped to generate respective anti-cogging forces acting on rotor permanent magnets 5190, 5195, that generate an anti-cogging effect on the rotor. As may be realized, recesses 5615, 5685 may also have suitable transition areas substantially similar to those described with respect to recesses 5105, 5175. The transition areas of the stator recesses may operate to generate anti-cogging forces minimizing cogging in the axial (e.g. Z direction normal to the plane of the stator in FIG. 7) and tangential directions. FIG. 7A shows graphical illustrations of the forces 5410, 5415 generated by respective transition areas acting on the rotor, and the cumulative force 5420 illustrating the anti-cogging effect (e.g. axial) of the transition areas of a recess. In the exemplary embodiment shown, the recesses 5105, 5175 (shown adjacent to each other for example purposes, though in alternate embodiments they may not be adjacent) may be positioned to cooperate with each other to further minimize cogging in combination, in both axial and tangential directions.

In the exemplary embodiment shown in FIG. 7, as few as two winding sets 5685, 5690 may be used to drive the disclosed embodiments. Winding sets 5685, 5690 may include one or more windings. It should be understood that the winding sets used for the aspects of the exemplary embodiments may include one or more windings located in one or more of the recesses and may include any type of windings suitable for use in the disclosed embodiments. The exemplary embodiments may include segmented windings, for example, winding sets divided into one or more winding subsets and distributed in selected recesses of the stators. Each winding subset may include one or more windings and may be driven to produce motor forces according to the disclosed embodiments. In one or more embodiments, the winding sets may be arranged as three phase winding sets, however, any suitable winding set arrangement may be used.

As may be realized from FIG. 7, a rotor for operation with the stator 5100 may include a plurality of permanent magnets with adjacent magnets having alternating polarities. In alternate embodiments the rotor may be formed of any suitable ferromagnetic material. Magnets 5150, 5180, 5190, and 5195 are shown for illustrative purposes. It should be understood that other magnets may be dispersed among the magnets shown.

The exemplary embodiments may also provide for a reduction of radial cogging forces, that is cogging forces parallel to the gap between the stator 100 and its respective rotor. Still referring to FIG. 7, the recesses 5105, 5615 on the surface 5110 of the stator 5100 may be suitably positioned so that forces generated on the rotor by the respective recesses combine to reduce radial cogging forces as described for example in U.S. Patent Application entitled "MOTOR STATOR WITH LIFT CAPABILITY AND REDUCED COGGING CHARACTERISTICS" previously incorporated by reference.

Referring now to FIG. 8, a schematic diagram of other exemplary anti-cogging elements 6800, 6210, 6215, 6220 is shown according to the disclosed embodiments. The anti-cogging elements 6800, 6210, 6215, 6220 may be constructed of any suitable material including, but not limited to, ferromagnetic material. The geometry of the elements 6800, 6210, 6215, 6220 is arranged such that the superposition of the cogging forces caused by components of the elements result in a minimal overall cogging disturbance along the propulsion and gap directions.

The components of the anti-cogging element 6800 in FIG. 8 include an inner arc-segment 6805, an outer arc-segment 6810, first and second transition zones 6815, 6820, a sequence of coil slots 6825, and a span angle 6830. The inner arc-segment 6805 may be arranged to allow for interaction with, for example, a permanent magnet rotor. In alternate embodiments the inner arc-segment 6805 may be configured to allow interaction with any suitably configured rotor. The coil slots 6825 may enclose a winding set, arranged for example as a three phase winding set. In alternate embodiments the winding set may have any suitable number of phases. The winding set may be driven in any suitable manner such as, for example, using a sinusoidal commutation scheme. The span angle 6830 may be arranged such that within its arc segment it accommodates an odd number of fractional magnet pitches. In alternate embodiments the span angle may be arranged to accommodate any suitable number of magnet pitches.

In the exemplary embodiment shown in FIG. 8 four anti-cogging elements 6800, 6210, 6215, 6220 are utilized for exemplary purposes. It should be understood that any number of anti-cogging elements (e.g. more or less than four) may be used. In one or more embodiments the anti-cogging elements 6800, 6210, 6215, 6220 may be substantially similar to each other and may be positioned about ninety mechanical and electrical degrees apart. In other embodiments, the anti-cogging elements 6800, 6210, 6215, 6220 may be arranged about ninety mechanical degrees apart with corresponding coil slots 6825, 6230, 6235, 6240, respectively, aligned with an imaginary 360 degree fractional slot pitch. In some embodiments only a subset of the coil slots may be populated with coils. In alternate embodiments the anti-cogging elements may have any suitable configuration and/or mechanical and electrical positioning with respect to each other. Suitable examples of anti-cogging elements are described in U.S. Patent Application entitled "MOTOR STATOR WITH LIFT CAPABILITY AND REDUCED COGGING CHARACTERISTICS," previously incorporated by reference.

Figure 9:
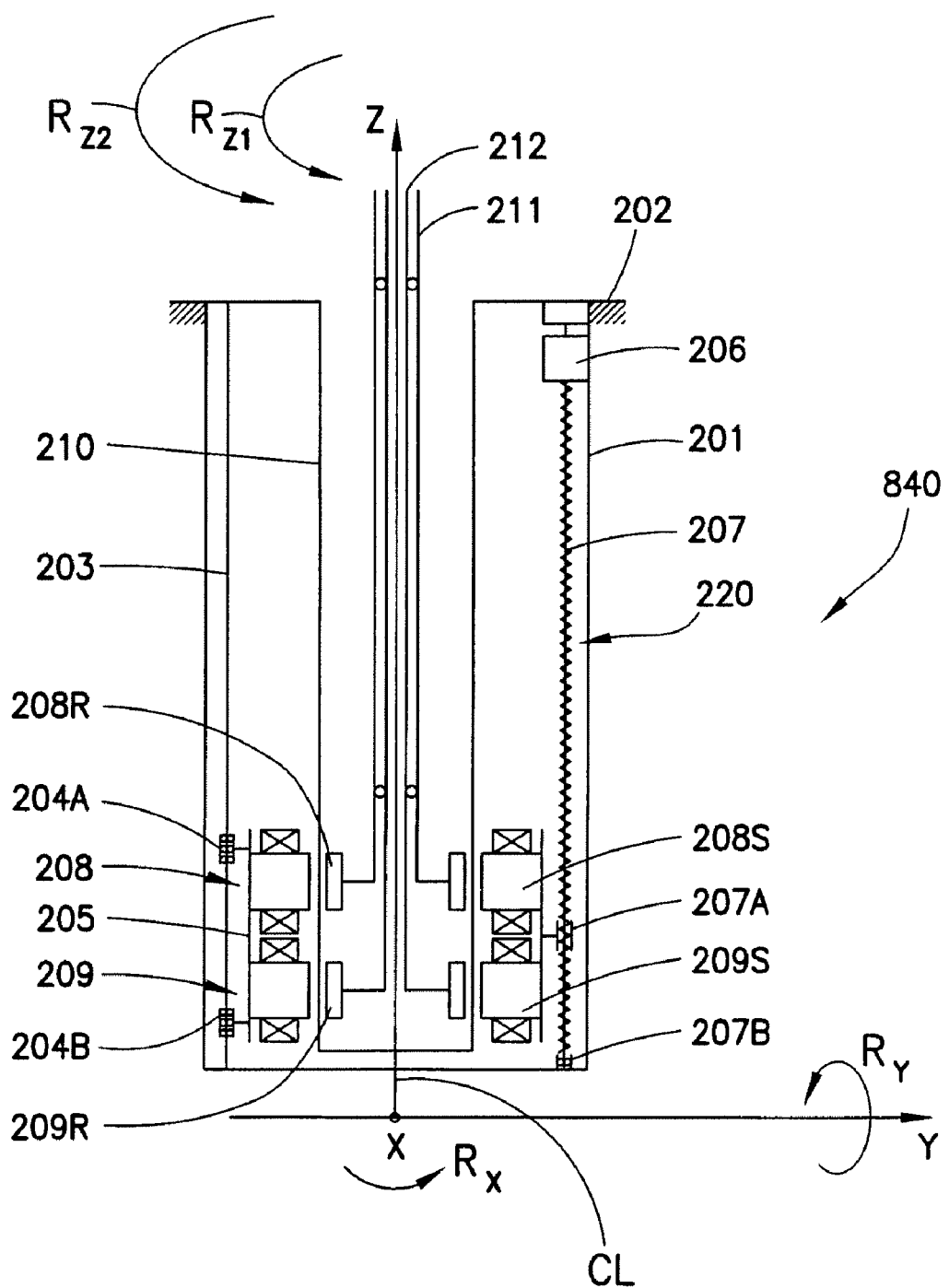
FIG. 9 is a schematic cross-sectional illustration of a substrate transport drive section in accordance with an exemplary embodiment.

Referring now to FIG. 9, in one exemplary embodiment, the drive section, such as drive section 840 of transport robot 800 may include a Z-drive unit 220, a first rotary motor 208 and a second rotary motor 209 located within a housing 201. While the Z-drive unit 220 and the motors 208, 209 are shown in the Figures as being located within the housing 201 it should be realized that alternate embodiments the Z-drive unit 220 and/or any portion of the motors 208, 209 may be located in separate housings. In still other alternate embodiments, the drive unit may have any suitable configuration.

The housing 201 may be constructed of any suitable material including, but not limited to, plastics, metals, ceramics, composites or any combination thereof. The Z-drive unit 220 may include a guide rail 203, Z-drive motor 206, ball screw mechanism 207 and carriage 205. The guide rail 203 may be any suitable guide rail made of any suitable material for linearly guiding the carriage 205 along the Z-direction within the housing 201. The guide rail 203 may be suitably supported at each end to housing. In alternate embodiments the guide rail may be supported in a number of locations along its length or may be cantilevered within the housing. The carriage may be supported within the housing by linear bearings 204A, 204B and ball screw member 207A. Linear bearings 204A, 204B and the ball screw member 207A may be attached to the carriage 205 in any suitable manner such as, for example, by mechanical or chemical fasteners, adhesives or by weldments. The linear bearings 204A, 204B may interact with the linear guide rail to allow the movement of the carriage in the Z-direction. The ball screw member 207A may interact with the ball screw 207 for moving the carriage 205 along the Z-direction when the ball screw 207 is caused to rotate by motor 206. The ball screw 207 may be supported on one end by any suitable bearing 207B that allows the ball screw member to freely rotate. The other end of the ball screw may be supported and coupled to the Z-drive motor 206 in any suitable manner. In alternate embodiments the ball screw 207 may be supported within the housing and caused to rotate in any suitable manner. The Z-drive motor may be any suitable motor including, but not limited to, stepper motors, servo motors or any other suitable AC or DC motors. In alternate embodiments, the drive may include any suitable linear actuator that may be magnetically, pneumatically, hydraulically or electrically driven. In still other alternate embodiments the linear actuator may be driven in any suitable manner. As may be realized the configuration of the Z-drive unit 220 shown in FIG. 9 is exemplary and the Z-drive unit 220 may have any suitable configuration.

Figure 10:
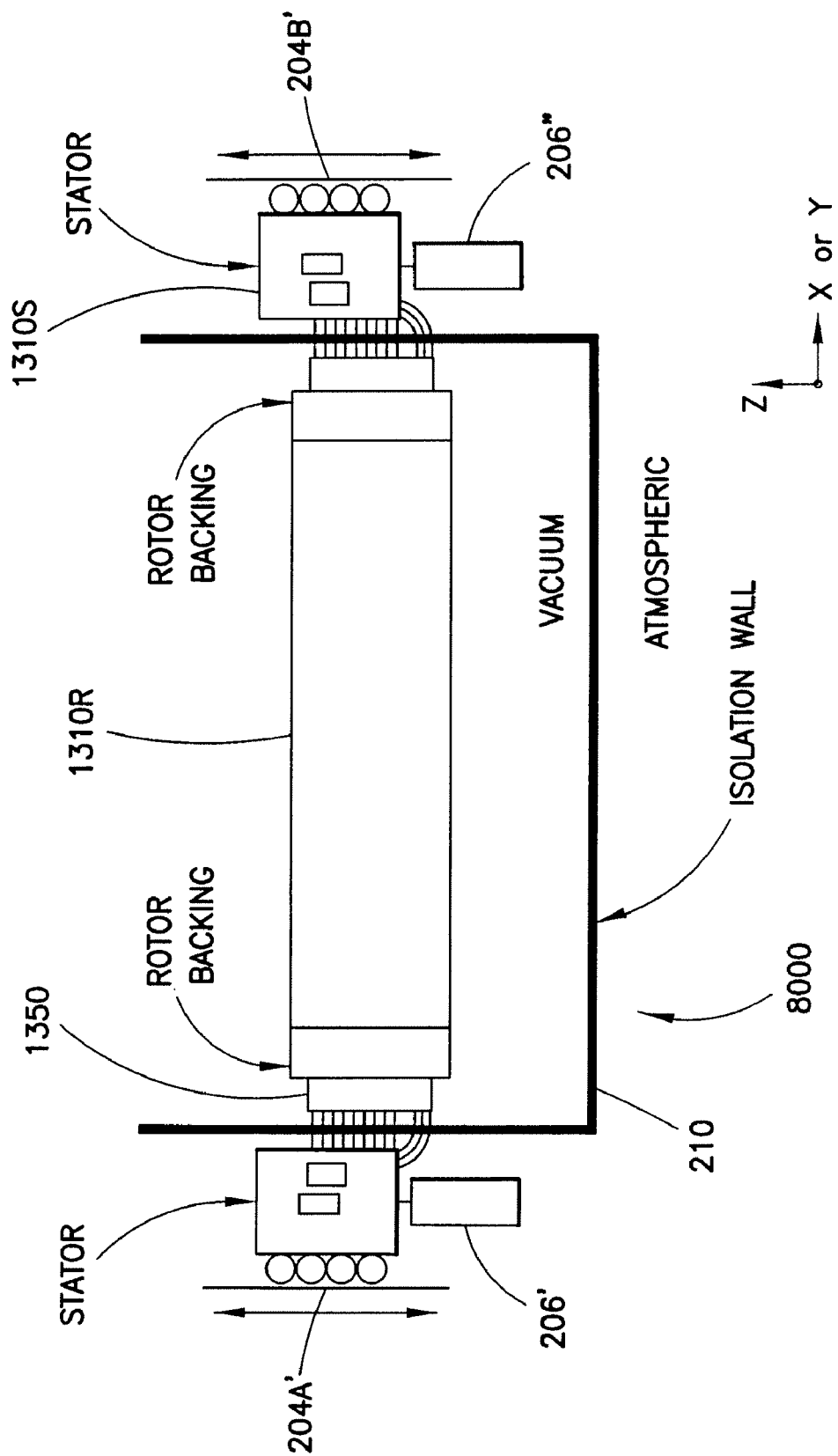
FIG. 10 is another schematic illustration of a portion of a substrate transport drive section in accordance with an exemplary embodiment.

Referring to FIG. 10, another exemplary embodiment of a portion of drive section 8000, such as drive section 840 of transport robot 800 is shown. In this exemplary embodiment any suitable number of Z-drive units may be used. In one exemplary embodiment, any suitable controller such as, for example, controller 170 may synchronize the motion of each Z-drive. In alternate embodiments the motion of the Z-drives may be synchronized in any suitable manner. In one embodiment, stator 1310S may be supported on, for example linear bearings 204A', 204B' which in turn are connected to a pair of Z-drive units 206', 206". The Z-drive units 206', 206" may be substantially similar to Z-drive unit 206 described above. In alternate embodiments the Z-drive units may be any suitable drive mechanisms.

Figure 11:
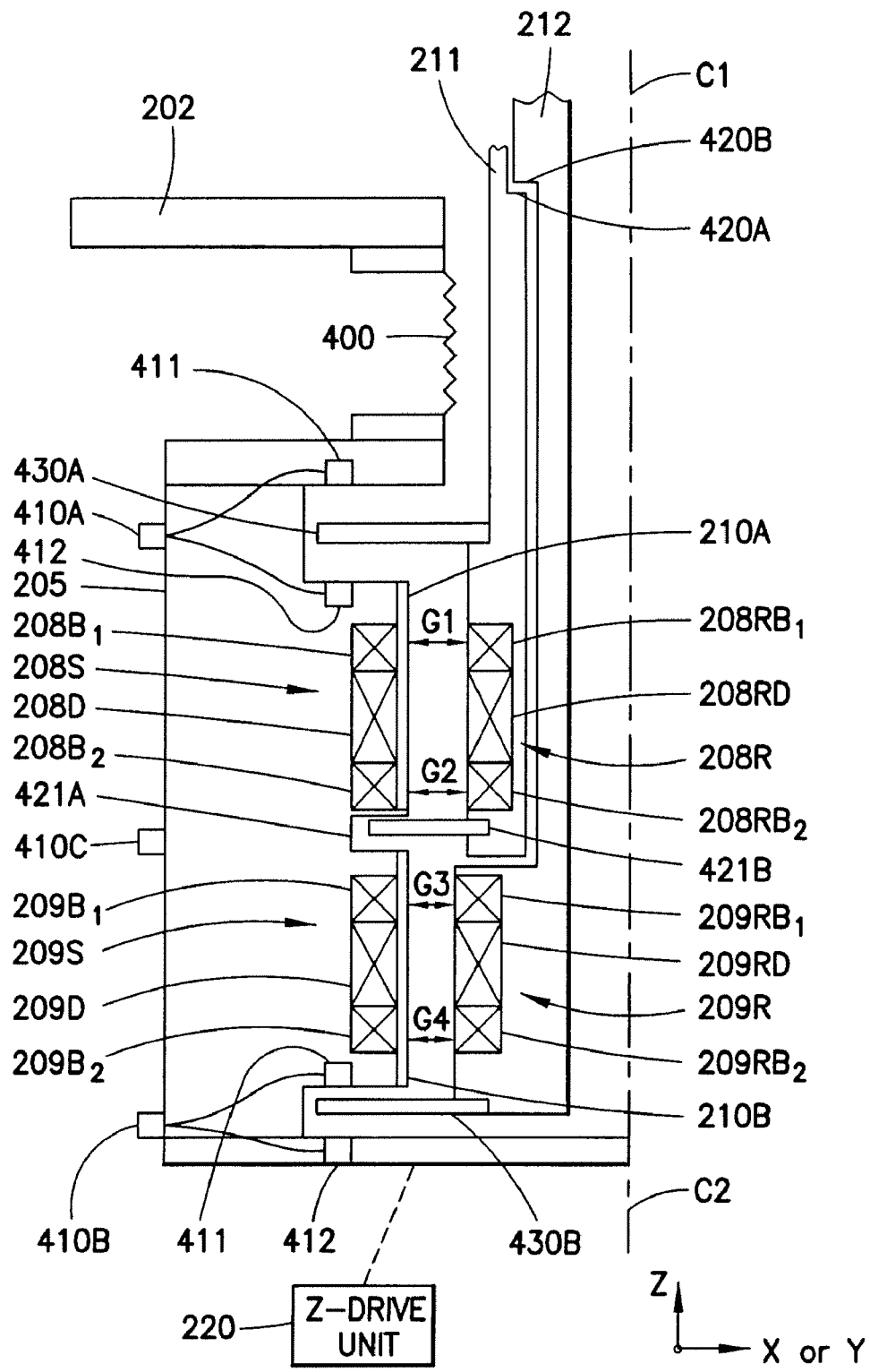
FIG. 11 is a schematic illustration of a portion of a substrate transport drive section in accordance with an exemplary embodiment.

Referring now to FIG. 11, an exemplary schematic illustration of a portion of the carriage 205 is shown. It is noted that the carriage 205 shown in FIG. 11 may be supported within the housing 201 (see FIG. 9) by the Z-drive unit(s) as described above with respect to FIGS. 9 and 10. In alternate embodiments, the carriage may be supported within the housing 201 in any suitable manner. As may be realized the drive section 840 of the robotic transport, such as, for example, transport 800 may be coupled to any suitable processing equipment using the mounting flange 202. To prevent particulates generated by the Z-drive unit(s), such as Z-drive unit 220, from entering the substrate processing environment a seal 400 may be provided between the carriage 205 and the mounting flange 202. For example, one end of the seal 400 may be attached to the mounting flange 202 while the other end of the seal is attached to the carriage 205. In this example, to allow for the Z-motion of the carriage 205, the seal 400 is shown as a bellows seal but in alternate embodiments the seal may be any suitable seal made of any suitable material including, but not limited to metals, plastics, rubbers and cloths. In other alternate embodiments the seal 400 may be omitted or replaced with any suitable barrier to isolate atmospheres across the barrier such as, for example, a portion of the housing 201, mounting flange 202 or carriage 205.

As can be seen in FIG. 11, the carriage may include a first stator 208S, second stator 209S, encoders 410A, 410B, 410C and coaxial drive shafts 211, 212. The outer drive shaft 211 may include encoder scale 430A, stop surface 420A and first motor rotor 208R. The inner drive shaft 212 may include encoder scale 430B, stop surfaces 420B and second motor rotor 209R. As can be seen in FIG. 11 the drive shafts 211, 212 (which are part of the motor spindle assembly) are shown as being longitudinally oriented along the Z-axis for exemplary purposes. The stators 208S, 209S and rotors 208R and 209R may form the self-bearing motors/magnetic spindle bearings 208, 209 described above. For exemplary purposes only, the stator 208S is shown as including a drive portion 208D and bearing portions 208B1 and 208B2 and it should be realized that in other exemplary embodiments, as described above, the stator may have only one portion or section that provides rotational forces, passive levitation, and/or radial positioning forces as will be described below. In alternate embodiments the stator 208S may include more or less than two bearing portions. The stator drive portion 208D interacts with rotor drive portion 208RD such that when the stator drive portion 208D is energized the resulting magnetic forces cause the rotor drive portion 208RD to rotate about center of rotation or axis C1 thereby rotating the outer shaft 211. In substantially the same manner, the inner shaft 212 is rotatably driven about axis C2 by stator drive portion 209D and rotor drive portion 209RD. An isolation barrier 210A, 210B may be provided over each of the stators 208S, 209S such that the rotors may operate in one environment while the stators operate in another environment as described above with respect to FIG. 3. It is noted that the isolation barriers 210A, 210B may be substantially similar to barrier 210 described above.

The center of rotation C1 of the outer shaft 211 may be controlled by the bearing portions 208B1, 208B2 of the stator and bearing portions 208RB1 and 208RB2 of the rotor. In the exemplary embodiments, the bearing portions may be configured to provide, for example, active radial bearing (e.g. in Rx and Ry) and passive lift (e.g. Rz), passive radial bearing and active lift or passive radial bearing and passive lift. In this exemplary embodiment the bearing portions 208B1, 208B2 may both be active bearings but in alternate embodiments one of the bearing portions may be a passive bearing portion. As may be realized, where an active radial bearing is combined with a passive lift stator, the rotor is stabilized in pitch and role such that a second passive radial bearing may be omitted. In other alternate embodiments the active radial bearing, the rotary portion and the passive lift stator can be combined into a single stator-rotor arrangement. Stator bearing portion 208B1 interacts with rotor bearing portion 208RB1 to, for example, control the air gap G1 while stator bearing portion 208B2 interacts with rotor bearing portion 208RB2 to, for example, control the air gap G2. It is noted that in FIG. 11, for exemplary purposes only, one half of the shaft is shown such that the gaps G1 and G2 correspond only to the gap in, for example the X-direction for the half of the drive section shown in the Figure. It should be realized, as described above, that the gap between the stator and rotor may vary around the circumference of the motor 208 as the position of the center of rotation C1 changes.

Similarly the center of rotation C2 of the inner shaft 212 may be controlled by the bearing portions 209B1, 209B2 of the stator and bearing portions 209RB1 and 209RB2 of the rotor in a manner substantially similar to that described above with respect to bearing portions 208B1, 208B2, 208RB1 and 208RB2. In this exemplary embodiment the bearing portions 209B1, 209B2 may both be active bearings but in alternate embodiments one of the bearing portions may be a passive bearing portion. As described above, where an active radial bearing is combined with a passive lift stator, the rotor is stabilized in pitch and role such that a second passive radial bearing may be omitted. In other alternate embodiments the active radial bearing, the rotary portion and the passive lift stator can be combined into a single stator-rotor arrangement. Stator bearing portion 209B1 interacts with rotor bearing portion 209RB1 to, for example, control the air gap G3 while stator bearing portion 209B2 interacts with rotor bearing portion 209RB2 to, for example, control the air gap G4. As noted above, it should be realized, that the gaps G3 and G4 between the stator and rotor portions may vary around the circumference of the motor 209 as the position of the center of rotation C2 changes. The transport apparatus controller, such as for example control 170, or any other suitable controller may be configured to receive gap measurement signals from sensors at various points around the circumference of the motors 208, 209 so that the windings may be energized to position the shafts 211, 212 at, for example, any suitable predetermined position and/or spatial orientation.

Figure 11A:
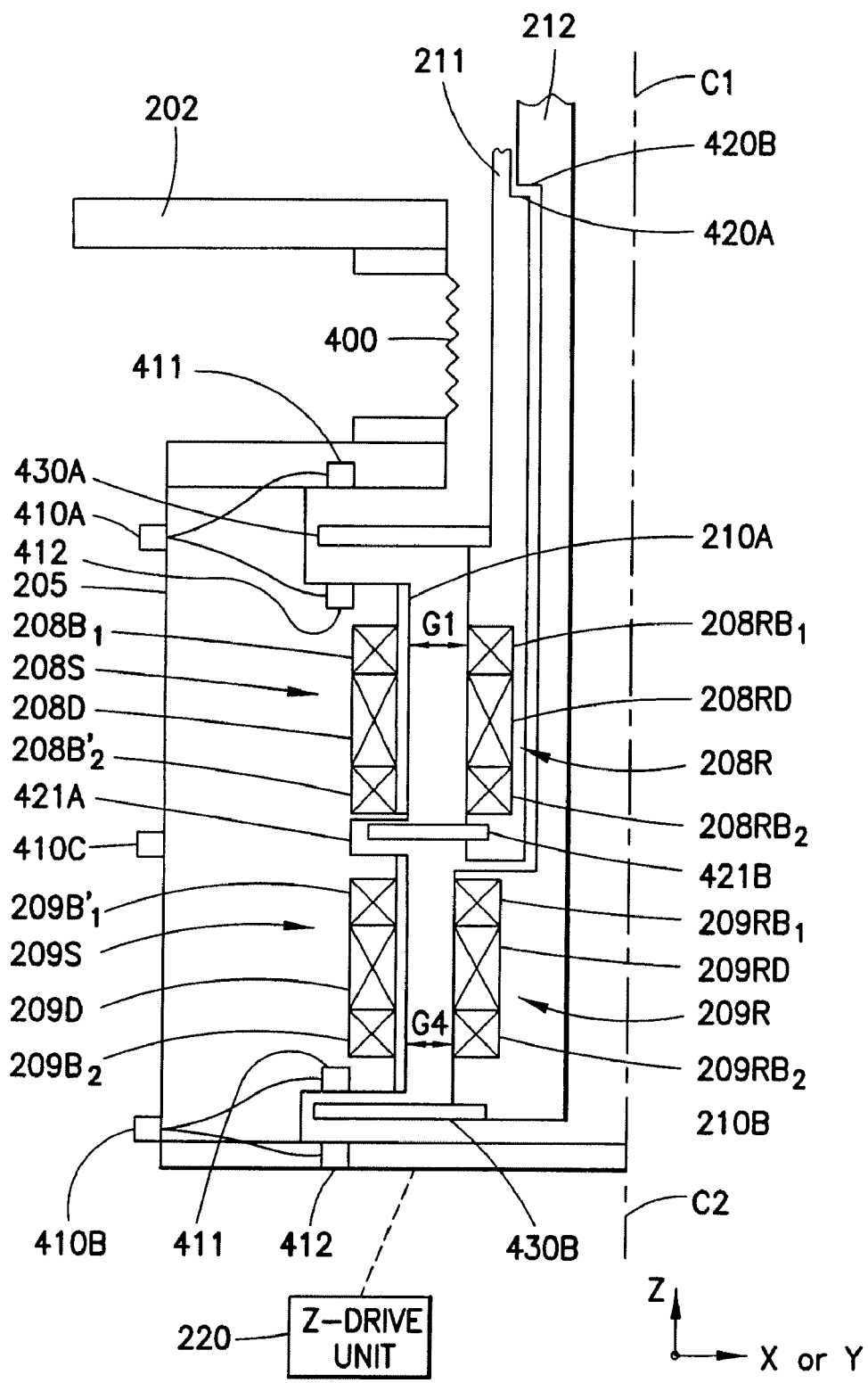
FIG. 11A is yet another schematic illustration of a portion of a substrate transport drive section in accordance with an exemplary embodiment.

Referring now to FIG. 11A, another exemplary schematic illustration of a portion of the carriage 205 is shown. It is noted that the carriage 205 is substantially similar to that described above with respect to FIG. 11 such that like features have like reference numbers. It is noted that the bearing portions may provide control of the rotors in a manner substantially similar to that described above with respect to FIG. 11. However, in this exemplary embodiment the bearing portions 208B1 and 209B2 are shown as active bearings while bearing portions 208B2' and 209B1' are shown as passive bearing portions for exemplary purposes only. In this exemplary embodiment, the passive bearings portions 208B2', 208B1' may passively provide radial stabilization for the rotors in any suitable manner. It should be realized, however, that in alternate embodiments the bearing portions may have any suitable active/passive bearing configuration. For example, bearings 208B1 and 208B2' may be active bearings while bearings 209B1' and 209B2 are passive (where shaft 212 is suitably supported within shaft 211 so that the shafts are concentric). In other examples, bearings 208B1 and 209B2 may be passive while bearings 208B2' and 209B1' are active. In this example, any suitable controller, such as controller 170, may energize the active bearing portions 208B1, 209B2 such that the shafts 211, 212 are positioned at any suitable predetermined position. In this example, the passive bearings 208B2' and 209B1' may act as a fulcrum for their respective active bearing so that the shafts 211, 212 can be spatially oriented, for example, by controlling the size of the gaps G1, G4.

Figure 11B:
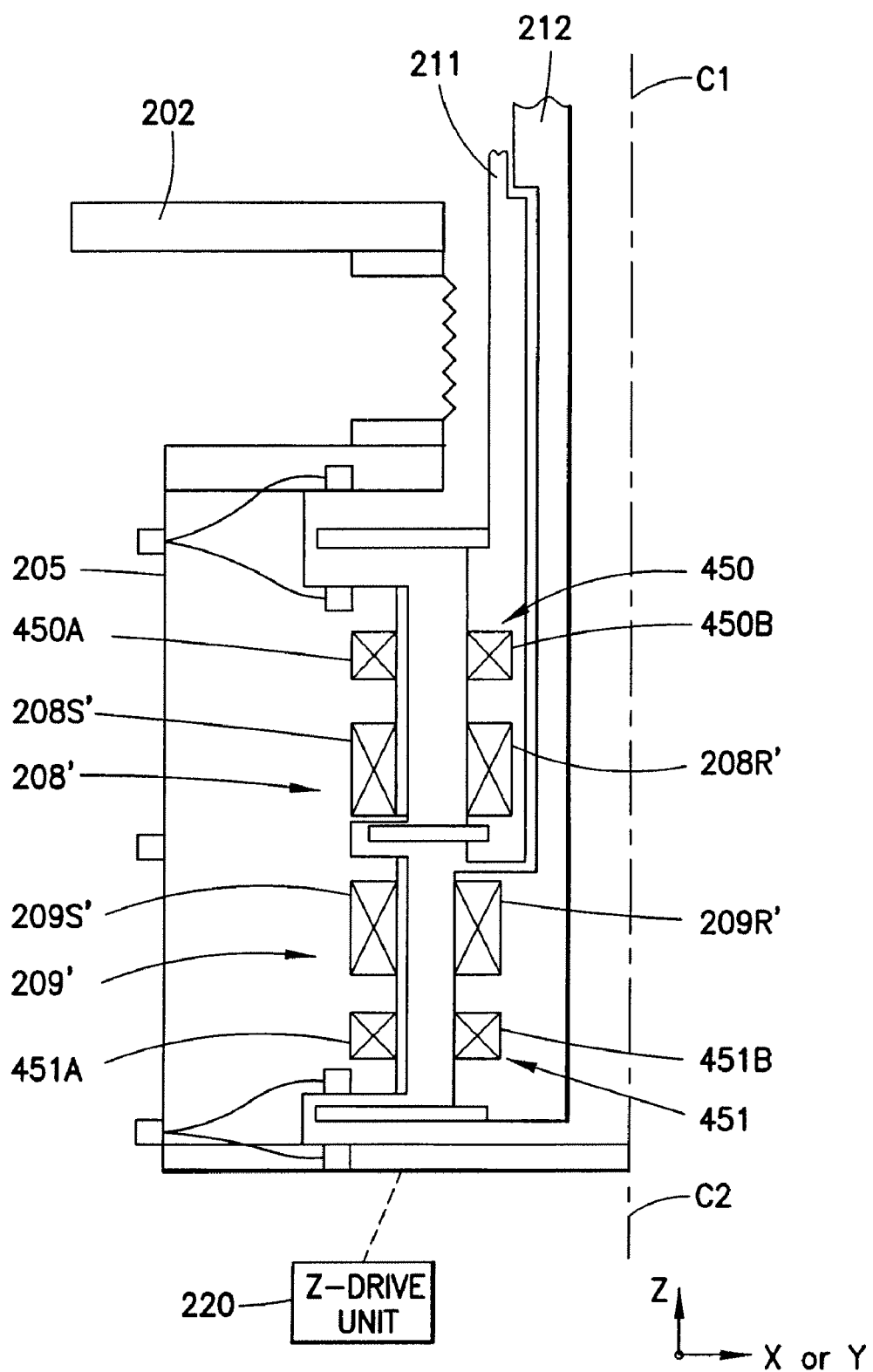
FIG. 11B is still another schematic illustration of a portion of a substrate transport drive section in accordance with an exemplary embodiment.

Referring now to FIG. 11B, another exemplary schematic illustration of a portion of the carriage 205 is shown. It is noted that the carriage is substantially similar to that described above with respect to FIG. 11 such that like features have like reference numbers. However, in this exemplary embodiment the magnetic spindle bearings 450, 451 are separated or distinct from the rotary drives 208', 209'. It is noted that the bearings 450, 451 may be substantially similar to bearing portions 208B1, 208RB1, 208B2, 208RB2, 209B1, 209RB1, 209B2, 209RB2 described above and are configured to provide bearing and lift control in a manner substantially similar to that described above with respect to FIG. 11. In this exemplary embodiment the drive 208' may include stator 208S', mounted in the carriage 205 and rotor 208R' attached to the shaft 211. Drive 209' may include stator 209S' mounted in the carriage and rotor 209R', attached to the shaft 212. The magnetic bearing 450 may include a first bearing member 450A located in the carriage and a second bearing member 450B attached to the shaft 211. The magnetic bearing 451 may include a first bearing member 451A located in the carriage and a second bearing member 451B attached to the shaft 212. While only two magnetic bearings 450, 451 (one on each shaft 211, 212) are shown in FIG. 11B it should be realized that in alternate embodiments any suitable number of magnetic bearings may be associated with each of the shafts 211, 212. In one exemplary embodiment, the magnetic bearings may be vertically segmented (i.e. the segments are offset vertically) so that each bearing 450, 451 provides individual tilt control over a respective one of the shafts 211, 212 along the Rx, Ry axes. In other exemplary embodiments, the shafts may be constrained with respect to each other in any suitable manner such as by, for example, suitable bearings provided between the shafts 211, 212 so that the shafts 211, 212 remain concentric while bearings 450, 451 stabilize or control the radial position and tilt (e.g. Rx, Ry) of the coaxial shafts 211, 212 as a unit.

Figure 11C:
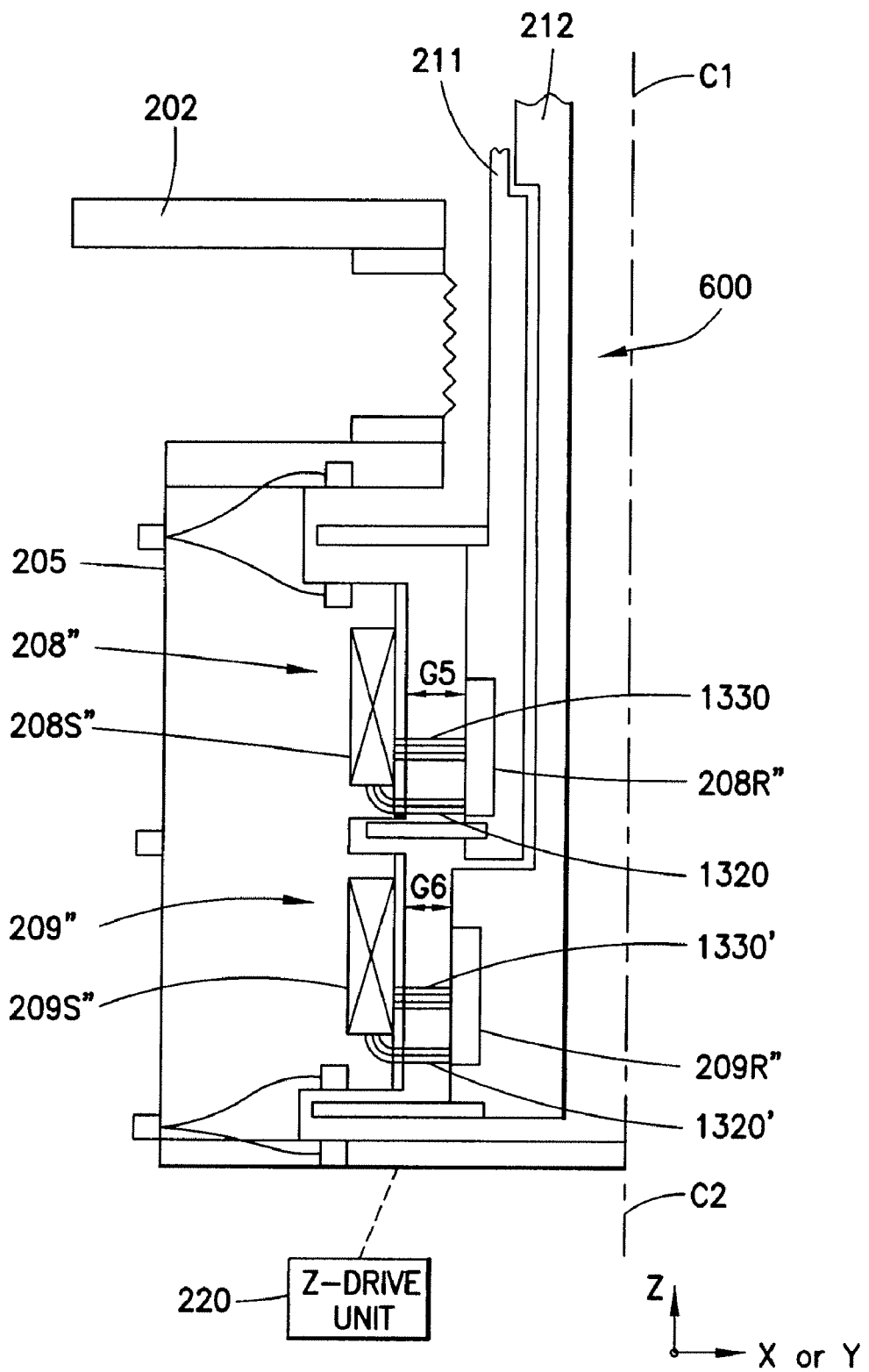
FIG. 11C is another schematic illustration of a portion of a substrate transport drive section in accordance with an exemplary embodiment.

Referring now to FIG. 11C, an exemplary schematic illustration of a portion of the carriage 205 is shown. It is noted that the carriage is substantially similar to that described above with respect to FIG. 11 such that like features have like reference numbers. However, in this exemplary embodiment the magnetic spindle bearings/stators 208'', 209'' are shown as having one portion or section configured to provide rotational forces, levitation, axial forces and/or planar X-Y (i.e. radial) positioning forces (e.g. the stator and passive bearings are integrated with each other in a unitary drive member). The magnetic spindle bearings/stators may be configured to provide bearing and lift control in a manner substantially similar to that described above with respect to FIG. 11. In one exemplary embodiment, the magnetic spindle bearings/stators 208'', 209'' may be configured as sets of interposed windings for generating the different driving forces for operating the drive section. In alternate embodiments the windings may be non-interposed windings that may be commutated in such a way as to generate the driving forces described herein. In this exemplary embodiment the interaction between the stators 208S", 209S" and their respective rotors 208R", 209R" may respectively produce the magnetic flux fields 1330, 1320 and 1330', 1320' and corresponding passive and attractive forces in a manner substantially similar to that described above with respect to FIG. 5. The motor 208" may be configured as described above to control the gap G5 while the motor 209" may be configured as described above to control the gap G6. As described above, by varying the gaps G5 and G6 the spindle 600 may be tilted and/or positionally located within, for example the X-Y plane for the fine positioning of, for example, the robot arm coupled to the spindle and thus the substrate carried on the robot arm. Thus, substantially solid state tilting and/or positioning of the robot arm can be performed substantially without moving parts. In one exemplary embodiment, the magnetic bearings/stators may be vertically segmented (i.e. the segments are offset vertically) so that each bearing 208", 209" provides individual tilt control over a respective one of the shafts 211, 212 along the Rx, Ry axes. In other exemplary embodiments, the shafts may be constrained with respect to each other in any suitable manner such as by, for example, suitable bearings provided between the shafts 211, 212 so that the shafts 211, 212 remain concentric while bearings 208", 209" stabilize or control the radial position and tilt (e.g. Rx, Ry) of the coaxial shafts 211, 212 as a unit.

Figure 11D:
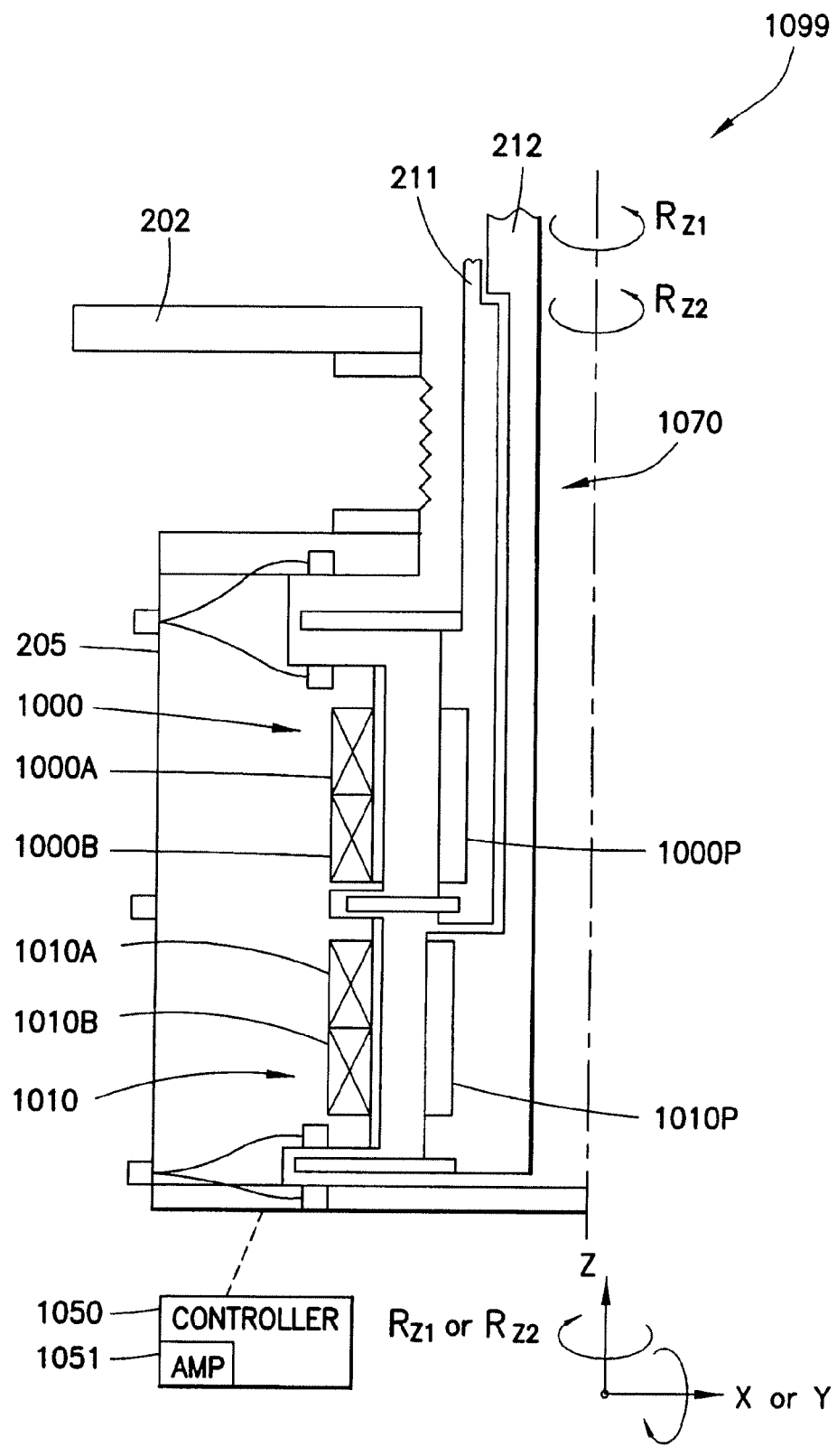
FIGS. 11D-11F schematically illustrates portions of a substrate transport drive section in accordance with an exemplary embodiment.
Figure 11E:
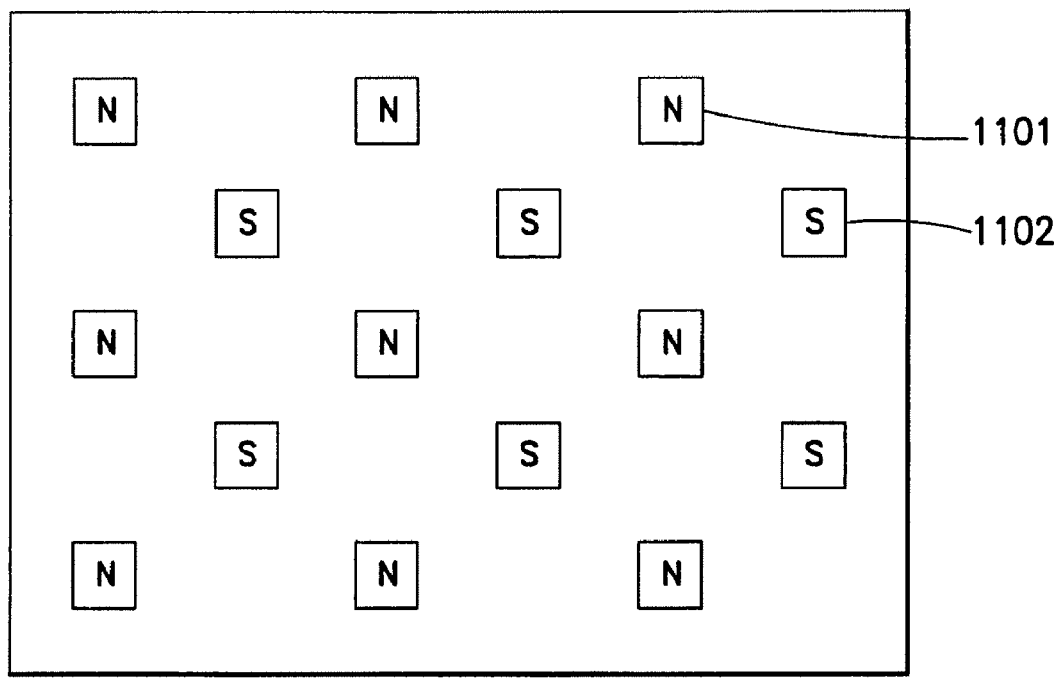
Figure 11F:
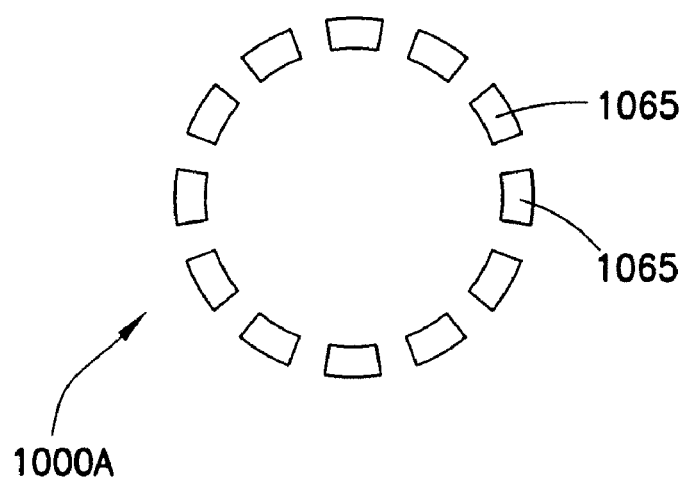

Referring now to FIGS. 11D-11F another exemplary motor configuration is shown in accordance with an exemplary embodiment. For example, the motors 1000, 1010 and their controller 1050, which may be similar to controller 170, may be configured so that an electrical angle is used to drive a common set of commutation functions to produce three dimensional forces including propulsion forces about an axis of rotation of the drive shafts 211, 212, propulsion forces in the z-direction and a guidance forces in the X and/or Y directions for tilting, rotating and positioning the spindle 1070. In other words, by adjusting the electrical angle with the electrical angle offset, at least one, two, and three dimensional forces may be produced in the motor using a common set of commutation equations. Examples of such a drive configuration is described in commonly assigned U.S. patent application Ser. No. 11/769,688, filed on Jun. 27, 2007 and entitled "COMMUTATION OF AN ELECTROMAGNETIC PROPULSION AND GUIDANCE SYSTEM", the disclosure of which is incorporated by reference herein in its entirety.

In this exemplary embodiment the two motors 1000, 1010 of drive unit 1099 provide, for example, at least seven degrees of freedom. For example, where the shafts 211, 212 are held coaxial with respect to one another via, for example, suitable bearings between the shafts 211, 212 the two motors may provide seven degrees of freedom. In another example, where the shafts 211, 212 are not constrained with respect to one another (i.e. the shafts can move relative to each other in all axes) the degrees of freedom provided by the two motors may be, for example, twelve degrees of freedom. The drive unit 1099 may be substantially similar to the drive unit described above with respect to FIG. 11 unless otherwise noted. FIG. 11D shows a drive unit where each of the motors 1000, 1010 are configured to provide forces in four dimensions (i.e. X, Y, Z and rotation of the respective shaft) for the operation of the transport. As may be realized, the motors may also produce moments along the Rx, Ry and Rz axes that results from forces produced by different segments of the stator windings. For example, in one exemplary embodiment, the windings of the motors may be vertically segmented in a manner substantially similar to that described above. A propulsion system for the shafts 211, 212 is shown that provides propulsion (i.e. rotation Rz1 for the outer shaft 211 and rotation Rz2 for the inner shaft 212) about the Z-axis using, for example, Lorentz forces, lift along the z-axis using, for example, Lorentz forces, and gap control along the X and Y-axes (i.e. planar motion in the X-Y plane as well as rotation Rx and Ry about the X and Y axes) using, for example, Lorentz and Maxwell forces when, for example, the shafts are held concentric with one another as described above. Where the shafts are not constrained with respect to each other the tilting (Rx, Ry) moments may be produced independently for each of the shafts 211, 212 by for example, different lift forces along the Rz axis produced by for example vertically offset winding segments along the circumference of each stator. In alternate embodiments the propulsion system may propel the shafts 211, 212 along the Rx, Ry, Rz1, Rz2, Z, X, Y axes/planes in any suitable manner.

In the exemplary embodiment shown in FIG. 11D the motors 1000, 1010 may respectively include winding sets 1000A, 1000B and 1010A, 1010B positioned in, for example, the carriage 205. Each of the winding sets 1000A, 1000B, 1010A, 1010B may include individual windings 1065 as can be seen with respect to winding 1000A in FIG. 11F. In alternate embodiments, the winding sets and/or the individual windings may have any suitable configuration such as, for example, the zig-zag or trapezoidal winding configurations described in United States Patent Publication 2005/0264119 previously incorporated by reference. The winding sets 1000A, 1000B and 1010A, 1010B may be driven by amplifier 1051, which may be part of controller 1050. In alternate embodiments the amplifier 1051 may be separate from the controller 1050. Amplifier 1051 may be any suitable amplifier such as, for example, a multi-channel amplifier capable of driving each of the individual windings 1065 of winding sets 1000A, 1000B, 1010A, 1010B separately or in groups. Winding sets 1000A and 1010A may have the same orientation and may be oriented for example, about ninety degrees from winding sets 1000B and 1010B respectively. In alternate embodiments the winding sets may have any suitable mechanical angular relationship, that may be more or less than about ninety degrees, for stably supporting the rotor (and shaft) with the resultant forces generated by the winding sets. As noted above, the winding sets may also have a suitably corresponding electrical angle shift therebetween to form the self bearing motor in cooperation with the respective shaft rotor.

In the exemplary embodiment shown in FIG. 11D each of the shafts 211, 212 of the drive unit 1099 respectively includes magnet rotors 1000P, 1010P. In the example shown, the magnetic rotors 1000P, 1010P may have permanent magnet arrays for example purposes only, though in alternate embodiments, the rotors 1000P, 1010P may not have permanent magnets and may be formed from, for example, ferromagnetic material. Each of the rotors 1000P, 1010P may be arranged as an array of magnets and may extend around the circumference of their respective shafts 211, 212. In one exemplary embodiment, as can be seen in FIG. 11E, the array of magnets of rotors 1000P, 1010P may be arranged with alternating north poles 1101 and south poles 1102 facing the winding sets 1000A, 1000B, 1010A, 1010B. In other exemplary embodiments the rotors 1000P, 1010P may have any suitable configuration including, but not limited to, those described in U.S. patent application Ser. No. 11/769,688, filed on Jun. 27, 2007 and entitled "COMMUTATION OF AN ELECTROMAGNETIC PROPULSION AND GUIDANCE SYSTEM", previously incorporated by reference. In alternate embodiments the winding sets and magnet platens may have any suitable configuration for driving the spindle assembly and shafts as described herein.

Any suitable sensor systems such as, for example, those described below with respect to FIGS. 12-15B may be provided for sensing the location, for example, the x, y, z, Rx, Ry and Rz coordinates of the individual shafts 211, 212 and/or the spindle assembly 1070. In alternate embodiments the relative motion between the rotors and stators may produce back electro-motive force that can provide positional information in any direction relative to the magnet array via, for example the sum of the voltages in a phase and/or in the direction normal to the magnet array via, for example different circuit voltages where each of the winding sets includes multiple circuits. In other alternate embodiments other suitable sensor systems may be utilized.

In one exemplary embodiment, the planar movement of the spindle assembly 1070 in the x and/or Y directions, the tilt Rx, Ry of the spindle assembly 1070, the rotation Rz1, Rz2 of each of the shafts 211, 212 and the movement of the spindle assembly 1070 along the Z-axis as described above may be controlled by adjusting the electrical angle with an electrical angle offset using a common set of commutation equations. In alternate embodiments the movement of the drive unit components may be controlled in any suitable manner. It is noted that in this exemplary embodiment the two motors 1000, 1010 provide, for example, seven degrees of freedom for the drive system 1099. As may be realized an the drive unit 1099 may also include a Z-drive unit as described above with respect to FIG. 9.

Figure 12:
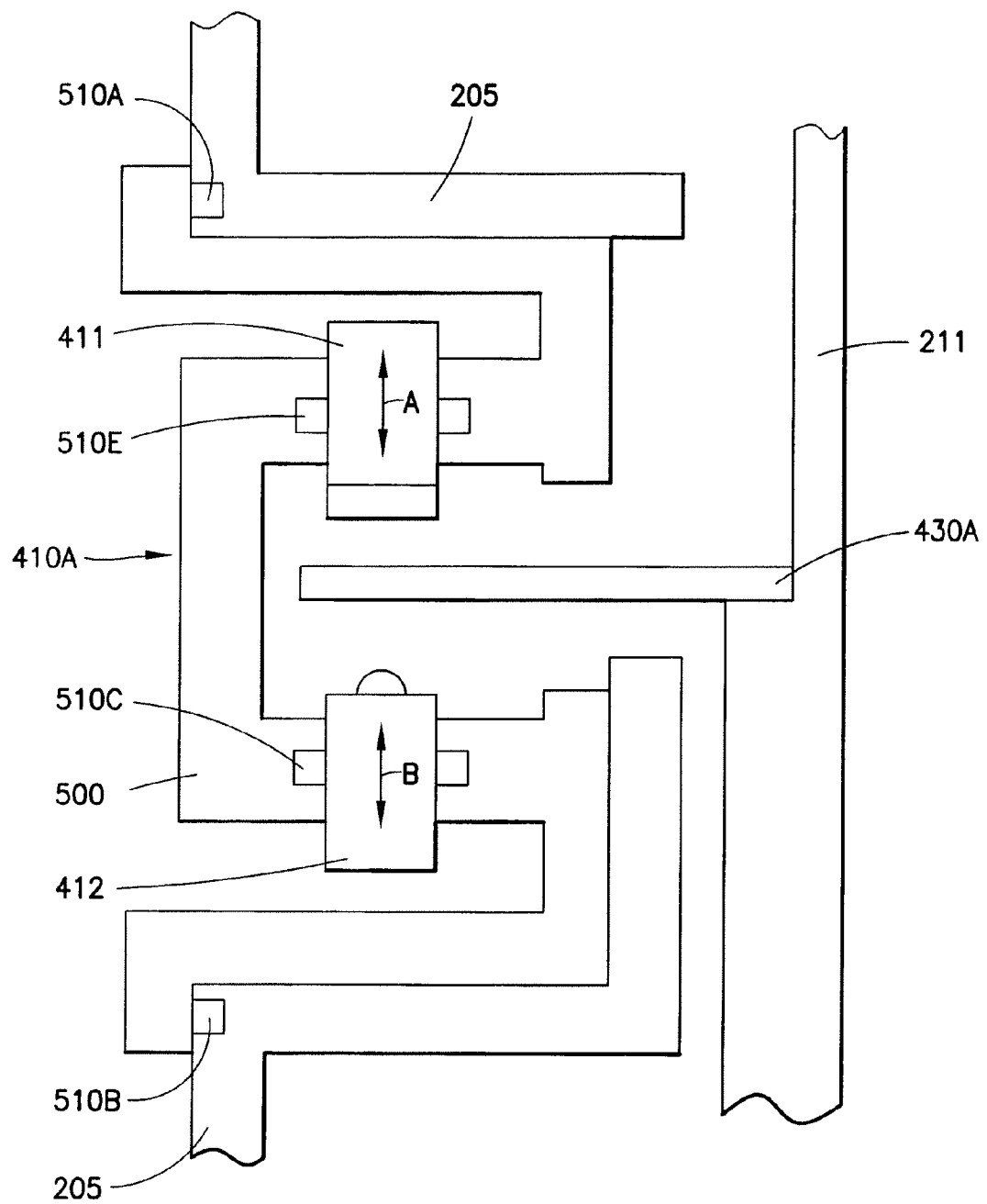
FIG. 12 is a schematic illustration of a portion of an exemplary drive section feedback system in accordance with an exemplary embodiment.

Referring again to FIG. 11 and also to FIG. 12, the rotational position of the outer and inner shafts 211, 212 may be tracked through, for example, any suitable encoders, such as encoders 410A, 410B and their respective encoder scales 430A, 430B. In alternate embodiments the relative motion between the rotors and stators may produce back electromotive force that can provide positional information as described above. In this exemplary embodiment, the encoders 410A, 410B are configured as optical encoders having an emitter 412 and a read head 411. In alternate embodiments the encoders may be configured as any suitable encoder including, but not limited to, optical, reflective, capacitive, magnetic and inductive encoders. The encoder scales 430A, 430B may be any suitable scales configured to allow the encoder to track a rotational position of their respective shafts. In one exemplary embodiment, as can be seen in FIG. 11, the encoder 410A may be mounted on the carriage 205 and arranged to interact with scale 430A, which may be mounted on the outer shaft 211. Encoder 410B may be mounted on the carriage 205 and arranged to interact with scale 430B, which may be mounted on the inner shaft 212. In alternate embodiments the scales may be located on the carriage while the encoders are located on a respective one of the drive shafts. In other alternate embodiments the encoders and encoder scales may have any suitable configuration. The positional signals output by the encoders 410A, 410B may be utilized by, for example, controller 170 to provide feedback as to the position of an arm link coupled to a respective one of the shafts and/or for motor commutation.

As can best be seen in FIG. 12, in one exemplary embodiment, an exemplary encoder emitter 412 and read head 411 may be coupled to an encoder frame or module 500 that may be inserted into the carriage. The encoder frame may be constructed of any suitable material including materials configured for use in a vacuum environment. The encoder frame 500 may be configured such that the emitter 412 and read head 411 may be movable in the direction of arrows A and B to allow for adjustment of the encoder with respect to the encoder scale 430A. Any suitable seals 510E, 510C may be provided between the emitter 412 and read head 411 and the encoder frame 500 to prevent any particulates from entering the substrate processing environment. Suitable seals 510A, 510B may also be provided between the encoder frame 500 and the carriage 205 to prevent particulates from entering the substrate processing environment. It is noted that encoder 410B may be substantially similar to encoder 410A. In alternate embodiments the encoder frame 500 may be configured such that the encoder emitter and read head are kept in an environment separate from the substrate processing environment and utilized through optical view ports to reduce the amount of materials that can outgas into, for example, a vacuum processing environment. In other alternate embodiments, any suitable feedback devices could be utilized including, but not limited to, Hall effect sensors, inductive sensors and resolvers.

Figure 12A:
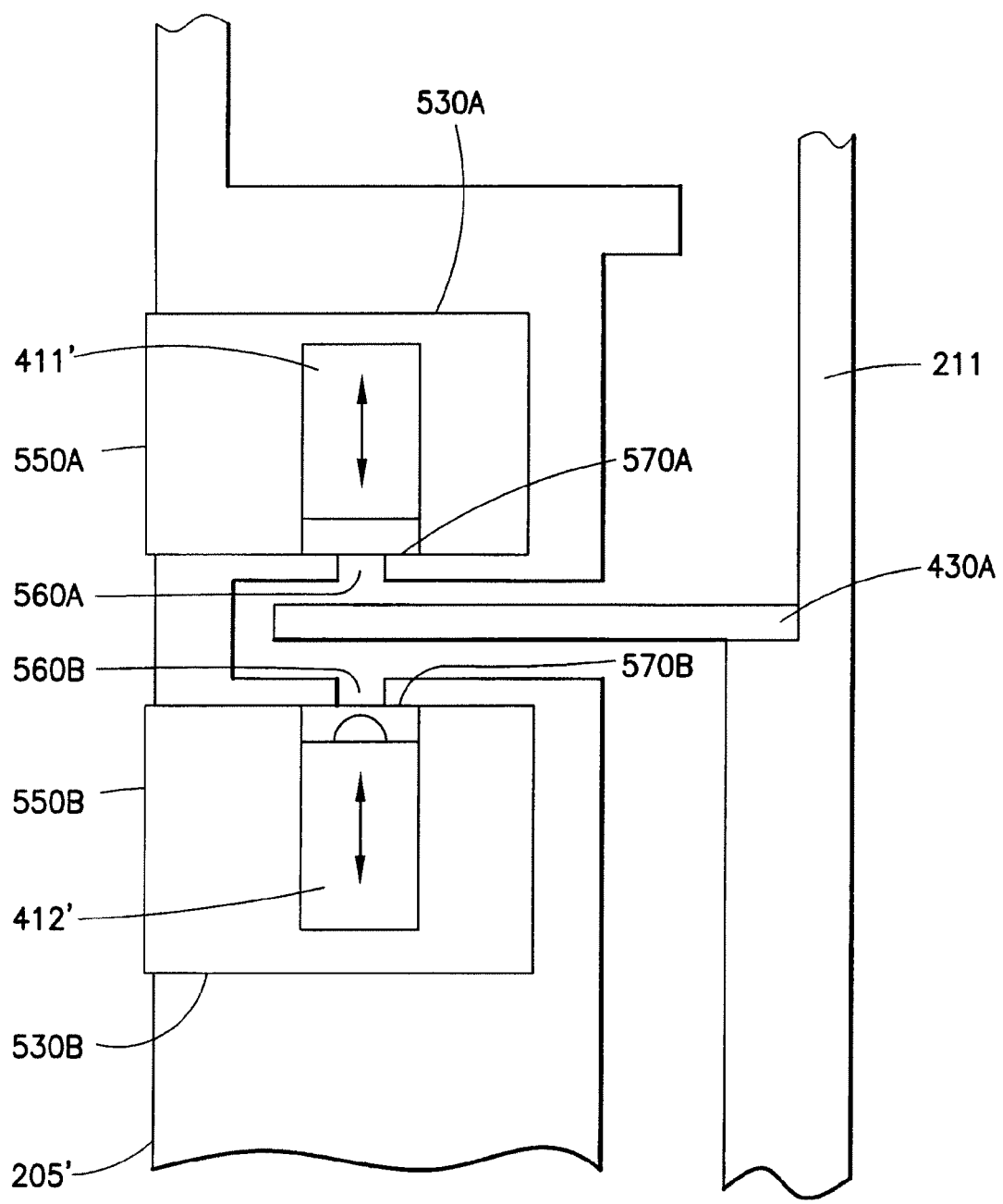
FIG. 12A is another schematic illustration of a portion of an exemplary drive section feedback system in accordance with an exemplary embodiment.

Referring now to FIG. 12A, another exemplary encoder configuration is shown in accordance with another exemplary embodiment. In this exemplary embodiment the carriage 205' may have recesses or openings 530A, 530B for accepting sensor inserts or modules 550A, 550B. The recesses 530A, 530B may have view ports 560A, 560B that allow the sensor components 411', 412' to sense the encoder scale 430A. The modules 550A, 550B may have any suitable shape and or configuration. For example the modules 550A, 550B may be configured such that upon insertion of the modules 550A, 550B into their respective recesses 530A, 530B the sensors 411', 412' are aligned with each other and the encoder scale. In alternate embodiments the modules may be adjustable within the recesses so that the sensors may be aligned with a respective encoder scale. As may be realized, while the modules 550A, 550B are shown in FIG. 12A as separate modules, in alternate embodiments the modules 550A, 550B may have a unitary construction (e.g. one piece). In this exemplary embodiment the module 550A may include an encoder read head 411' positioned in the module 550A such that the read head 411' is aligned with the view port 560A when the module 550A is inserted into the carriage 205'. In this exemplary embodiment the read head 411' forms a seal 570A between the module 550A and the carriage 205' to prevent any leakage of atmosphere or the passage of contaminates into or out of the substrate processing area. In alternate embodiments, the seal may be formed between the read head and carriage in any suitable manner. In other alternate embodiments, a "window" or optically clear material that is separate from the read head 411' may cover and seal the view port 560A. Module 550B may include an encoder emitter 412' positioned in the module 550B such that the emitter 412' is aligned with the view port 560B when the module 550B is inserted into the carriage 205'. In this exemplary embodiment the emitter 412' forms a seal 570B between the module 550A and the carriage 205' to prevent any leakage of atmosphere into or out of the substrate processing area. In alternate embodiments, the seal may be formed between the read head and carriage in any suitable manner. In other alternate embodiments, a "window" or optically clear material that is separate from the emitter 412' may cover and seal the view port 560B. As may be realized the modules 550A, 550B may be suitably connected to a controller, such as controller 170, for providing feedback regarding shaft orientation, planar position and rotational position. It is noted that the configuration of the exemplary modules 550A, 550B shown in the drawings is for example purposes only and that the modules 550A, 550B may have any suitable configuration and/or include any suitable types of sensors including, but not limited to, inductive and capacitive sensors.

The encoders 410A, 410B, 550A, 550B may also be configured to measure, for example, one or more of the gaps G1-G4 between the stators and rotors of the motors 208, 209. For example, the scale 430A may be configured to allow the encoders to measure the air gaps. In alternate embodiments the encoders may be configured to measure the air gaps in any suitable manner. In other alternate embodiments additional encoders or other feedback devices may be positioned in, for example, proximity of the shafts 211, 212 for measuring one or more of the gaps G1-G4.

Figure 13:
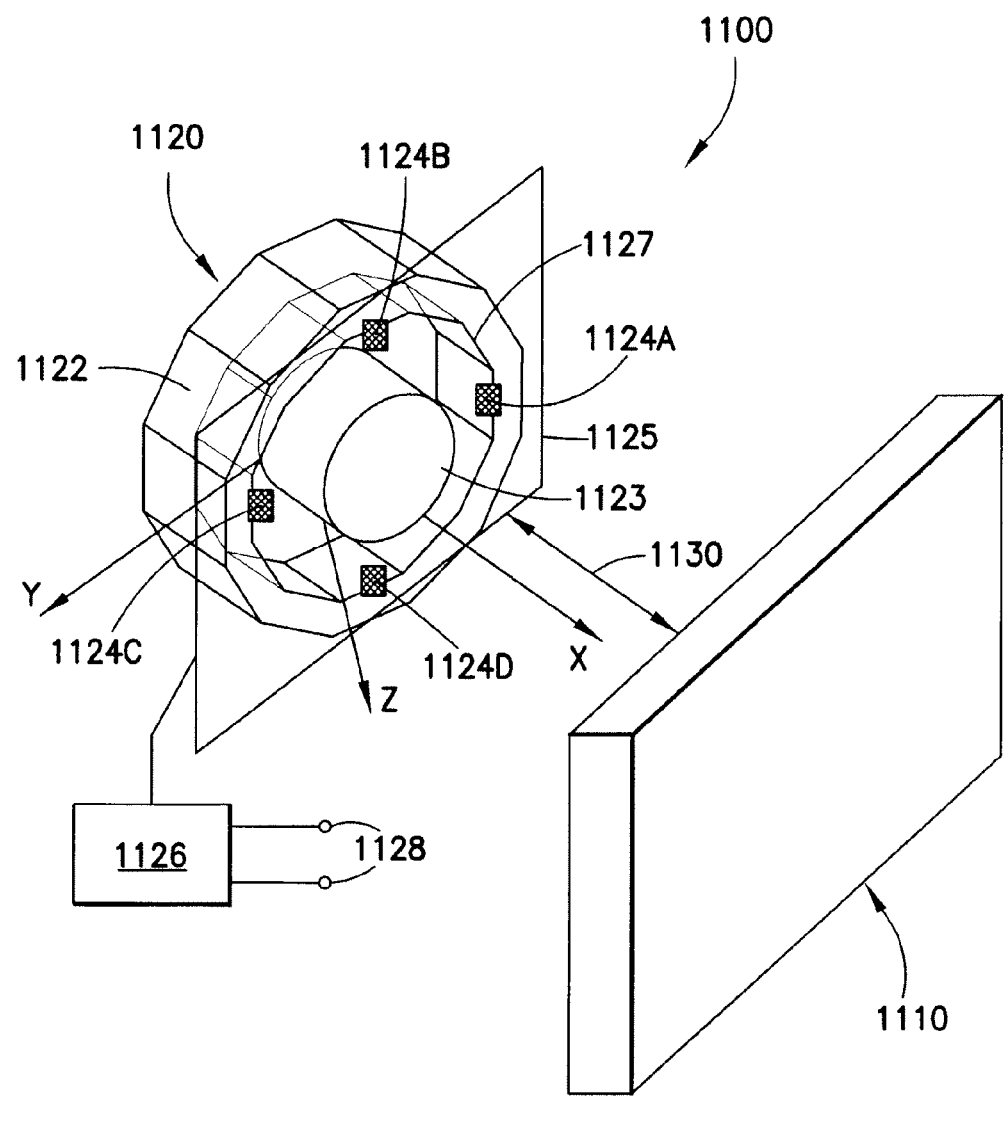
FIG. 13 is a schematic illustration of a portion of an exemplary drive section feedback system in accordance with an exemplary embodiment.

Referring now to FIG. 13, another exemplary sensor configuration 1100 is shown for detecting, for example, the rotational position, axial position, X-Y planar position and/or gap with respect to, for example, drive shaft 211. In this exemplary embodiment, the sensor configuration 1100 is configured as a non-invasive sensor such that no optical view ports or feed-throughs are needed in, for example, the barrier 210 that isolates, for example, the vacuum environment from the atmospheric environment.

The sensor configuration 1100 of FIG. 13 may utilize magnetic circuit principles for determining, for example the distance from a ferromagnetic target 1110 (that may be affixed to e.g. the rotor or drive shaft) to the transducer or read head frame. The ferromagnetic target may have any suitable contour (e.g. curved for rotary drive or flat for linear drives) and have any suitable profile(s) embedded in it as will be described in greater detail below. In this exemplary embodiment, the transducer or read head 1120 includes, for example, a ferromagnetic element 1122, a permanent magnet 1123, magnetic sensors 1124A-1124D and a mounting substrate 1125. The permanent magnet 1123 may have any suitable shape such as for example the cylindrical shape shown in FIG. 13. The poles of the permanent magnet 1123 may be oriented such that they are parallel with the mounting substrate however, in alternate embodiments the poles may be oriented in any suitable manner. The magnetic sensors 1124A-1124D may be any suitable magnetic sensors including, but not limited to, Hall effect sensors, reed switches and magnetoresistors.

The ferromagnetic element 1122 may have any suitable shape such as, for example, the cup shape shown in FIG. 13. The ferromagnetic element 1122 may be positioned relative to the permanent magnet 1123 such that the cupped shape is concentric with the permanent magnet 1123. In alternate embodiments the ferromagnetic element 1122 may have any suitable positional relationship with the permanent magnet 1123. The permanent magnet 1123 may be coupled to a center of the ferromagnetic element 1122 in any suitable manner such as for example, through magnetic attraction, mechanical fasteners and/or adhesives. The configuration of the permanent magnet 1123 and the ferromagnetic element may be such that a magnetic circuit is created where a magnetic flux is formed with a uniform density along a certain path. In the exemplary embodiment shown in FIG. 13, the magnetic flux density may be uniform along the circle 1127.

In this example, the four magnetic sensors 1124A-1124D are placed along the uniform magnetic flux path indicated by circle 1127 such that their outputs are substantially the same. It should be realized that in alternate embodiments any suitable number of magnetic sensors may be placed along the uniform magnetic flux path. The outputs of the magnetic sensors may be routed to any suitable conditioning circuit 1126 for processing the sensor output signals to optimize the quality of the output signal 1128. As may be realized increasing the number of magnetic sensors in the read head 1120 may increase the noise immunity of the read head 1120. In alternate embodiments the magnetic sensors may be arranged in pairs with alternating orientations relative to the flux density lines. The pairs of sensors can each provide a differential output that may improve noise immunity on the signal routing from the read head location to any suitable device that will read the signal. In other alternate embodiments the magnetic sensors may be arranged in any suitable manner.

In operation, placing the ferromagnetic target 1110 in front of the read head 1120 may alter the magnetic flux density vector sensed by the magnetic sensors 1124A-1124D thereby modifying the output signal 1128 of the magnetic sensors 1124A-1124D. As may be realized the distance or gap 1130 between the ferromagnetic target 1110 and the read head 1120 influences the value of the output signal 1128. As may also be realized the shape of the permanent magnet 1123 and ferromagnetic element 1122 may be optimized to maximize the range of operation (e.g. the distance 1130) of the read head 1120.

Figure 14:
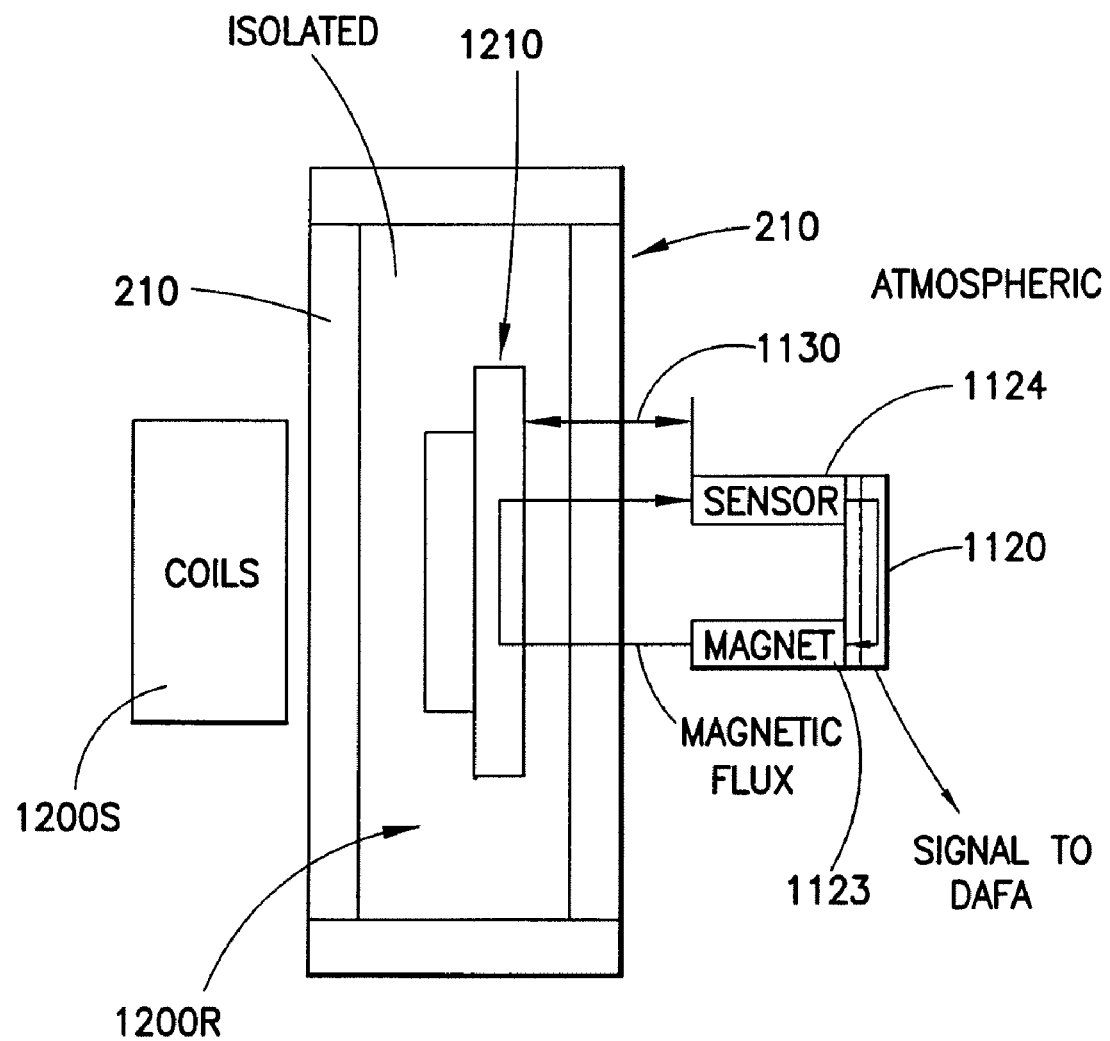
FIG. 14 is a schematic illustration of a portion of the exemplary drive section feedback system of FIG. 13.

The sensor configuration of the exemplary embodiment of FIG. 13 may be capable of sensing the gap between, for example, the rotor 1200R and stator 1200S through the barrier 210 in a non-invasive manner as can be seen in FIG. 14. FIG. 14 shows a schematic illustration of a portion of the sensor configuration described above with respect to FIG. 13. In this exemplary embodiment, the ferromagnetic target may be the rotor backing 1210, but in alternate embodiments the target may be any suitable ferromagnetic target. The read head 1120 may interact with the rotor backing 1210 such that the magnetic flux lines pass from the read head 1120 through the barrier 210 to the rotor backing 1210 and back to the sensor 1124. The sensor signal may be sent to, for example any suitable electronics, such as controller 170 for reading the signal and the determination of the gap 1130 size.

Figure 14A:
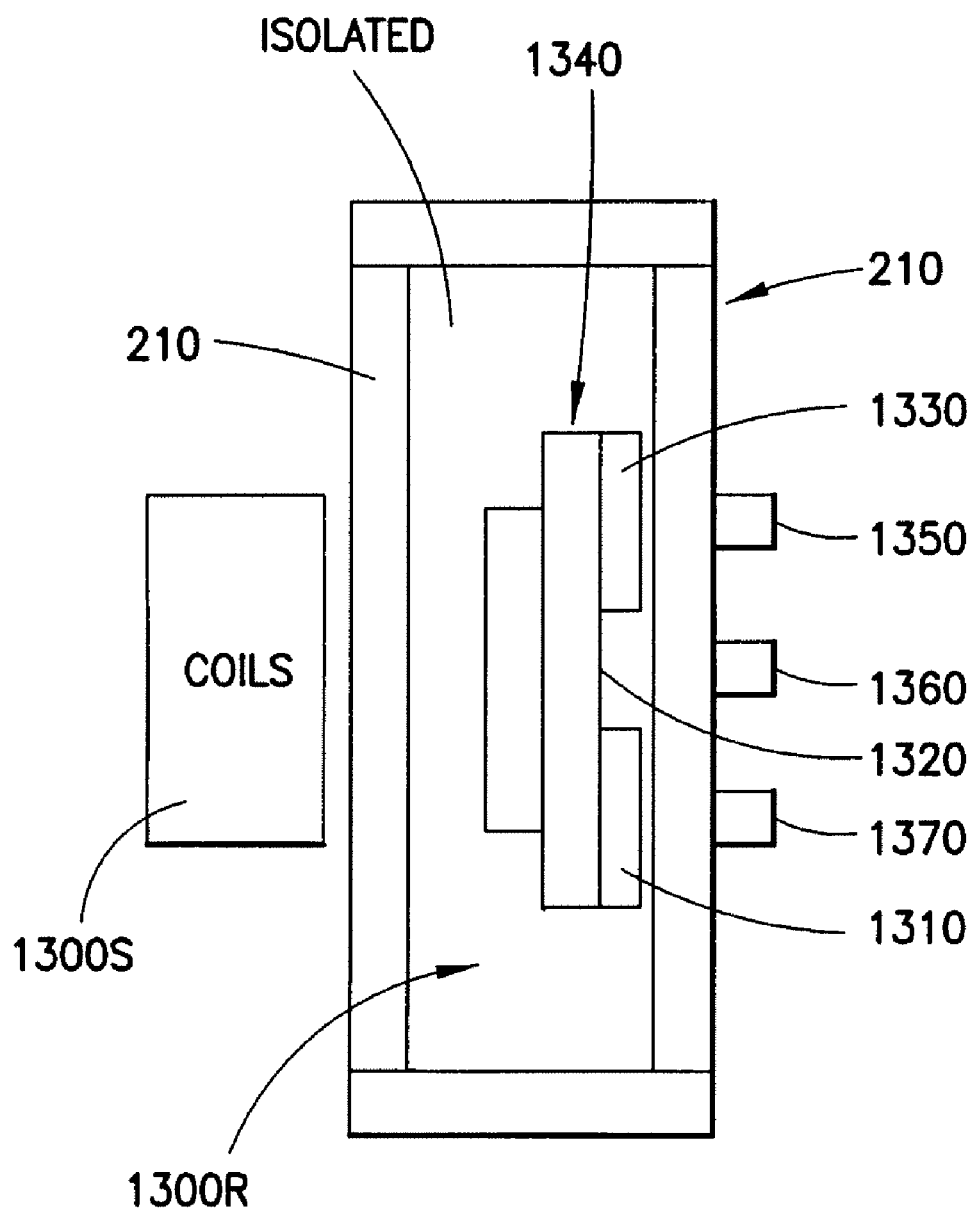
FIGS. 14A and 14B are schematic illustrations of a portion of an exemplary drive section feedback system in accordance with an exemplary embodiment.
Figure 14B:
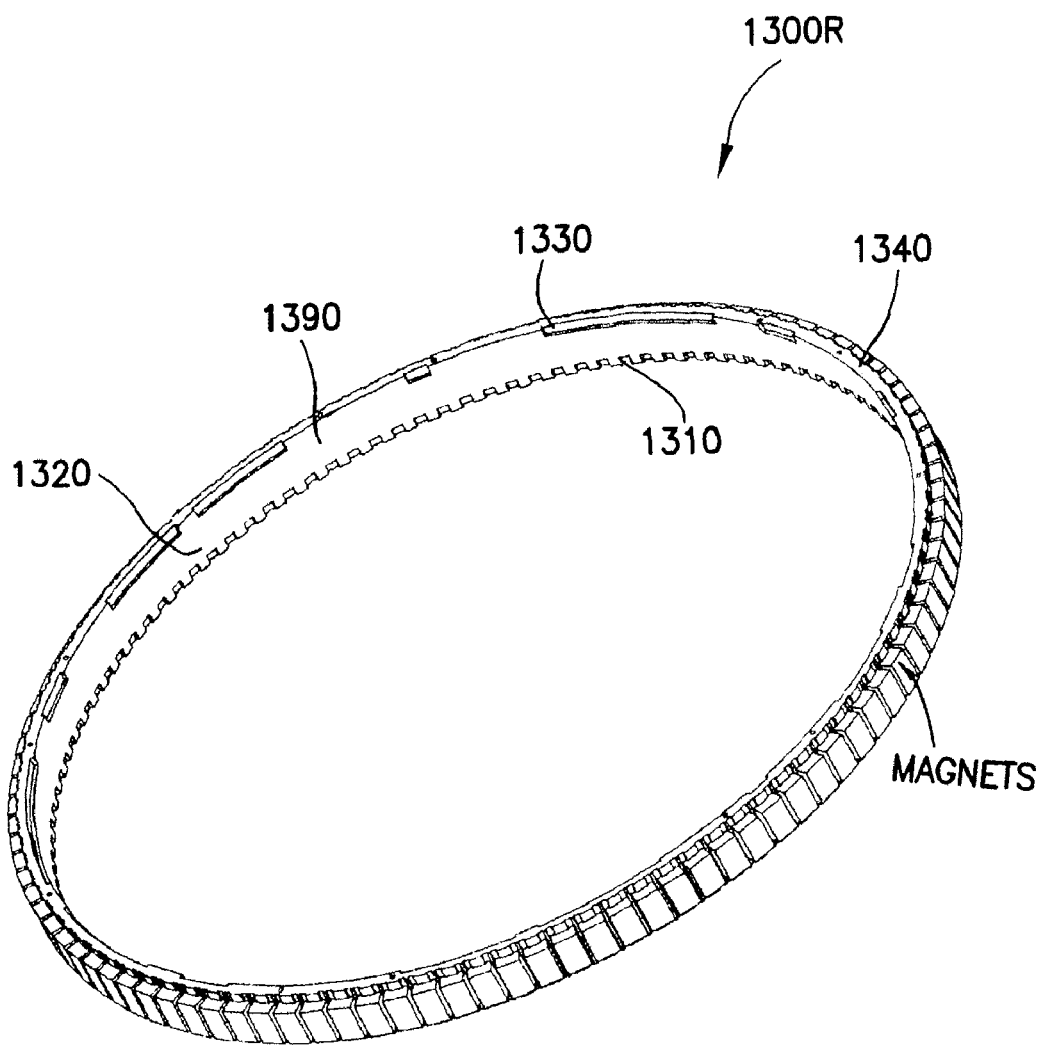

Referring now to FIGS. 14A and 14B, another exemplary sensor feedback system is illustrated in accordance with an exemplary embodiment. As can be seen in FIG. 14A, the sensor system includes a ferromagnetic target 1340 and three sensors 1350-1370. In alternate embodiments the feedback system may include more or less than three sensors. In this exemplary embodiment, the ferromagnetic target may be the rotor backing, but in alternate embodiments the target may be any suitable ferromagnetic target. As can be seen best in FIG. 14B the ferromagnetic target 1340 in this example is configured as a rotor 1300R that may be utilized in, for example the motor described above with respect to FIGS. 4A and 4B for exemplary purposes only. The rotor backing 1340 may have several profiles embedded in a surface 1390 of the rotor backing 1340. In this example, an absolute track profile 1330 and an incremental track profile 1310 are embedded or otherwise formed in the backing 1340. The absolute and incremental track profiles 1330, 1310 may include any suitable profile (e.g. lands and grooves, recesses, etc.) for suitably tracking a position of the rotor 1300R. In alternate embodiments the rotor 1300R may have any suitable configuration of profiles. In alternate embodiments the profiles may be provided separately from the rotor 1300R and located at any suitable location within the drive section. It is also noted that while the ferromagnetic target is described as being the rotor backing, it should be realized that the ferromagnetic target may be separate from the rotor. For example, the ferromagnetic target may be attached to any suitable position on, for example, a drive shaft of the exemplary embodiments described herein.

The sensors 1350-1370 may be substantially similar to each other and to read head 1120 described above. In alternate embodiments the sensors 1350-1370 may be any suitable sensors. In this exemplary embodiment, the sensors 1350-1370 may be positioned relative to the rotor 1300R such that each sensor provides a different sensor reading. For example, the sensor 1350 may be aligned with the absolute track profile 1330 to form an absolute position sensor. Sensor 1360 may be aligned for interfacing with the non-profiled surface 1320 of the rotor backing 1340 to form a gap sensor. Sensor 1370 may be aligned with the incremental track profile 1310 to form an incremental position sensor. In alternate embodiments the sensors may be configured along with a respective magnetic target to provide any suitable positioning information. Other suitable feedback systems for use with the drive sections of the exemplary embodiments is described in U.S. patent application Ser. No. 12/163,984 entitled "POSITION FEEDBACK FOR SELF BEARING MOTOR", filed on Jun. 27, 2008, the disclosure of which is incorporated by reference herein in its entirety.

As may be realized, the carriage 205 may also include any suitable sensor, such as, for example, sensor 410C shown in FIG. 11 for sensing the position of the carriage 205 along the Z-direction. The sensor 410C may be substantially similar to sensors 410A, 410B. In alternate embodiments the sensor 410C may be any suitable sensor having any suitable configuration, including, but not limited to, those sensors described herein.

Referring back to FIG. 11, as may be realized the motors/magnetic spindle bearings 208, 209 may not support the shafts 211, 212 when the windings of the motors 208, 209 are not energized, such as when the transport apparatus (e.g. transport 800) is powered down or otherwise loses power. The carriage 205 and/or shafts 211, 212 may be configured such that the shafts 211, 212 are supported in any suitable manner when the windings are not energized. In one exemplary embodiment as can be seen in FIG. 11, the carriage 205 may include a support surface 421A and the outer shaft 211 may include a support member 421B that is coupled to the shaft in any suitable manner. In alternate embodiments the support member 421B may be of unitary construction with the shaft 211. As the windings 208B1, 208B2 are de-energized the outer shaft 211 may be lowered so that the support member 412B rests on support surface 421A. As may be realized the shape and/or configuration of the support surface 421A and support member 421B may be any suitable shape and/or configuration for stably supporting the shaft 211 when the windings 208B1, 208B2 are not energized.

The shaft 211 may also have a support surface 420A and the inner shaft 212 may have a support member 420B. In this example the, support member 420B of the inner shaft 212 is shown as being of unitary construction with the shaft 212 but in alternate embodiments the support member 420B may be a separate member coupled to the shaft 212 in any suitable manner. As the windings 209B1, 209B2 are de-energized the inner shaft may be lowered so that the support member 420B of the inner shaft interacts with the support surface 420A of the outer shaft 211 to support the inner shaft 211. The shape and/or configuration of the support surface 420A and support member 420B may be any suitable shape and/or configuration for stably supporting the shaft 212 when the windings 209B1, 209B2 are not energized.

It is noted that the support surfaces and support members shown in FIG. 11 are for exemplary purposes only and that the shafts 211, 212 may be supported in any suitable manner when the transport is in a powered down state. For example, in alternate embodiments the shafts may be supported by any suitable supports including, but not limited to, ball bearings, roller bearings and/or suitable bushings. In other alternate embodiments, permanent magnets may be located in the carriage in proximity to the outer and inner shafts 211, 212. The permanent magnets of the carriage may interact with respective permanent magnets located on the shafts 211, 212 such that the shafts 211, 212 are supported when the transport is powered down. It is noted that where permanent magnets are utilized to support the shafts 211, 212 the windings 208B1, 208B2, 209B1, 209B2 may have sufficient power to overcome the magnetic forces produced by the permanent magnets so that the center of rotation of the shafts can be positioned as described herein.

Figure 15:
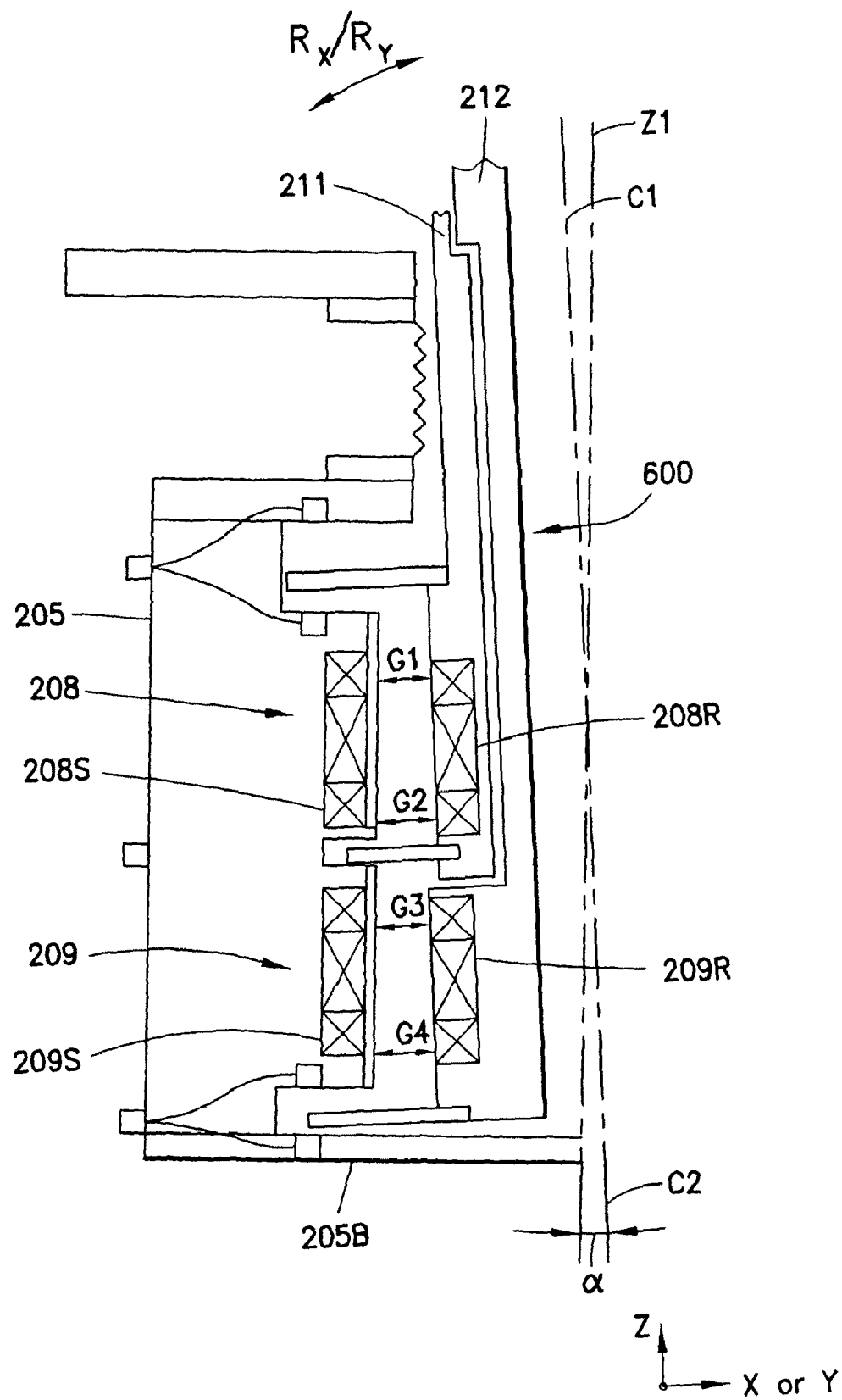
FIG. 15 is a schematic illustration of the substrate transport drive section of FIG. 11 shown in another position in accordance with an exemplary embodiment.
Figure 16:
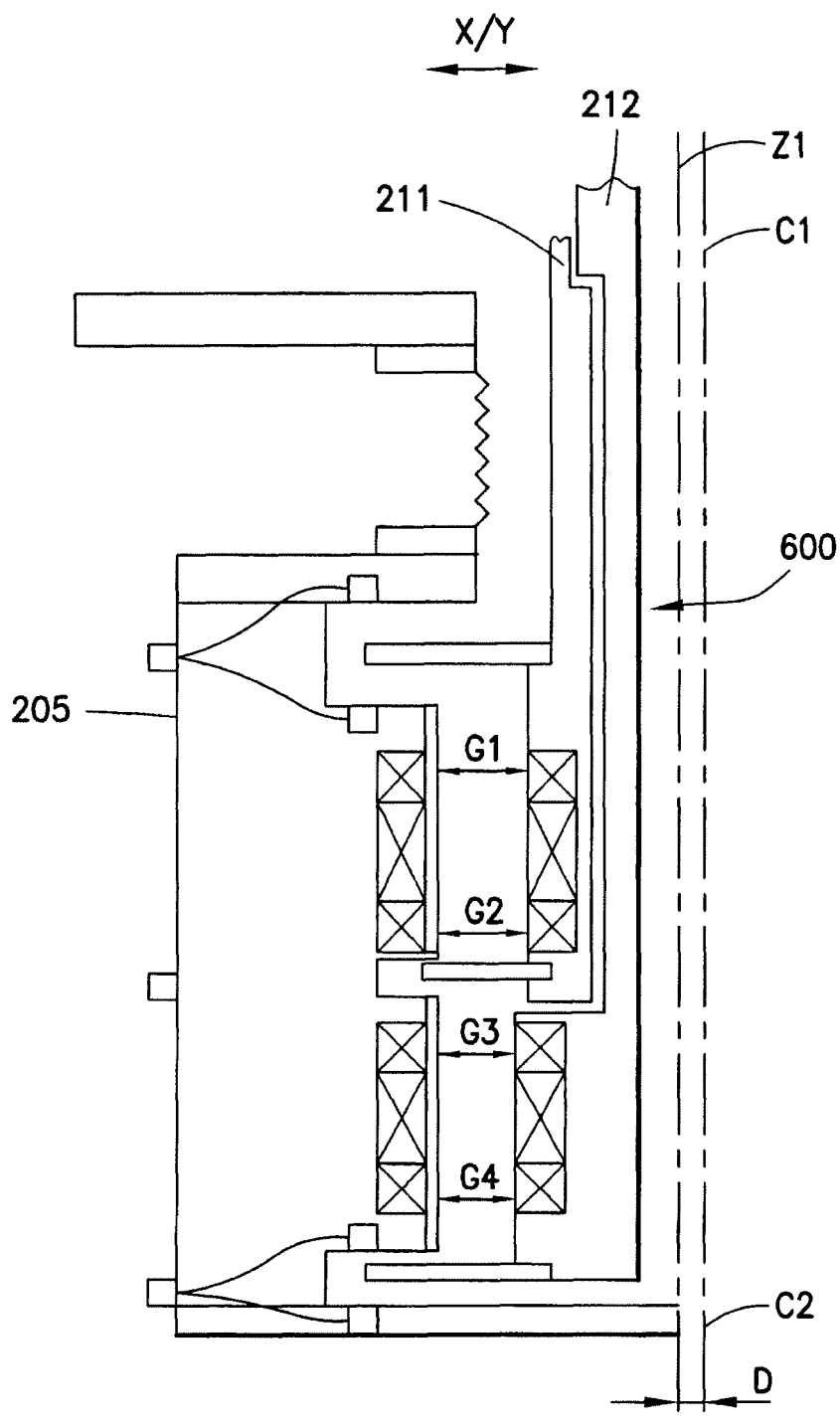
FIG. 16 is a schematic illustration of the substrate transport drive section of FIG. 11 shown in still another position in accordance with an exemplary embodiment.

Referring now to FIGS. 15-17, an exemplary operation of the exemplary embodiments will be described. As described above the shafts 211, 212 may be coupled in any suitable manner to arm links of the transport apparatus.

As can be seen best in FIG. 15 the controller (e.g. controller 170) may be configured to energize the motor windings of stators 208S and 209S to produce radial and/or tangential forces so that the rotors 208R, 209R are skewed along the Z-axis by an angle α which causes the longitudinal centerline C1, C2 of shafts 211, 212 to be tilted with respect to, for example, the centerline Z1 of the carriage 205 and/or stators 208S, 209S (i.e. the spindle 600 is rotated about the X and/or Y axes) as shown in FIG. 15. As can be seen in FIG. 15, the air gaps G1-G4 increase towards the bottom 205B of the carriage 205 for exemplary purposes only and it should be realized that the air gaps may increase or decrease depending on the direction of tilt with respect to the X-Y plane. The controller may be configured to energize the windings of the stators 208S, 209S so that the air gaps G1-G4 and the tilt angle α are maintained as the arm is extended or retracted. In alternate embodiments the windings may be energized to tilt the spindle 600 after the arm is extended or retracted. In still other alternate embodiments the spindle 600 may be tilted at any point in time during the operation of the arm. As may be realized the tilt may be in any suitable direction such as a tilt Rx in the X-direction, a tilt Ry in the Y-direction or a tilt in both the X and Y directions. The angle of tilt α may be limited only by, for example, the size of the air gap G1-G4 between the stators 208S, 209S and the rotors 208R, 209R.

As can be seen in FIG. 16, the windings may also be energized so that the spindle 600 is translated in the X-Y plane such that the centerline of the shafts 211, 212 (i.e. spindle 600) remains parallel with the Z-axis. In the example shown in FIG. 16, the longitudinal centerline or center of rotation of the shafts 211, 212 is moved by a distance D away from, for example, the centerline Z1 of the carriage 205 or any other suitable location within the drive system. The air gaps G1-G4 shown in FIG. 16 are illustrated as being substantially equal but as noted above, it should be realized the air gaps will be different depending on which point on the circumference of the stators/rotors the air gap is measured. It is noted that the distance D traveled by the spindle in the X-Y plane (e.g. the X-Y translation) may only be limited by the size of the air gaps G1-G4.

The X-Y translation and/or the tilting of the spindle assembly 600 and the arm 800 coupled thereto may be utilized to fine tune the position of the arm 800 so that a substrate S located on the end effector 830 is suitably spatially positioned in or on, for example, a substrate processing chamber, a load lock, an aligner, a substrate cassette or any other suitable equipment used in processing and/or storing the substrate. For example, referring to FIG. 17, a schematic illustration of a transport 900 and a substrate station 910 are shown. The transport includes a spindle assembly 600 and an arm 800 as described above. The substrate station 910 may be any suitable station for supporting, storing and/or processing a substrate such as, for example, a substrate aligner. In this example, the transport may be, for example, mounted so that the centerline of the spindle 600' (e.g. when the air gap between the spindle and the stators is substantially uniform) is not perpendicular with the substrate seating plane 911 of the substrate station 910. As such, a substrate S located on the end effector 830 of the arm 800 may not be parallel with the substrate seating plane 911. The windings of the motors of the transport 900 may be energized as described above to tilt the spindle at an angle of α' in the X-Y plane so that the substrate S is substantially parallel with the substrate seating plane 911 when the substrate is placed on the substrate station 910. As may be realized the spindle assembly 600 may also be translated in the X and/or Y directions to fine tune the orientation and/or position of the end effector and the substrate S carried on the end effector with respect to the substrate station 910. As may also be realized the translation of the substrate in the X and/or Y direction may also be effected through a tilting of the spindle in the direction the substrate is to be translated and moving the substrate in for example, the Z-direction to compensate for the tilt of the spindle when placing the substrate. In fine tuning the orientation and/or position of the end effector, the end effector may be leveled or made substantially parallel with a substrate seating surface or plane and/or the position of the end effector may be adjusted in, for example the X-Y plane without rotating, extending or retracting the robot arm. The fine tuning of the end effector position through controlling the centerline of the spindle assembly 600 may also be utilized to compensate for sag in the arm 800 or for any other suitable purpose.

It is also noted that the substrate station 910 shown in FIG. 17 may incorporate a drive system substantially similar to that described above with respect to FIGS. 15-17 such that the substrate seating surface attached to, for example a drive shaft of an aligner motor may be tilted and/or translated as described herein.

The drive sections of the exemplary embodiments as described herein include, for example, seven degrees of freedom which include X, Y, Z, Rx, Ry, Rz1 and Rz2. In one exemplary embodiment, Rz1 and Rz2 are associated with the rotation of the shafts 211 and 212 respectively. X, Y, Rx and Ry are associated with the location and/or tilt of the spindle 600 (i.e. offsetting the position of the rotors 208R, 209R). Z is associated with the movement of the carriage 205 (and the arm 800) along the Z-direction. It is noted that in one embodiment there are six degrees of freedom provided by the two motors 208, 209 while the seventh degree of freedom is provided by the Z-drive unit 220. In other embodiments such as that shown in FIGS. 11D-11F seven degrees of freedom may be provided by the two motors while an eighth degree of freedom is provided by a Z-drive unit.

As noted above, the number of degrees of freedom of the exemplary drives is not limited to seven. In alternate embodiments drive sections in accordance with the exemplary embodiments may have more or less than seven degrees of freedom. For example, the transport apparatus may be mounted on a movable carriage that allows the entire transport to be translated in a one, two or three dimensional direction. In other examples, the drive system may have more or less than two drive shafts.

These multiple degrees of freedom in the drive unit may allow for the fine leveling and positioning of substrates while compensating for any misalignment between the transport and substrate station and/or any deflection from cantilever effects of the substrate transport. The magnetic spindle bearings provided by the drive section of the exemplary embodiments may also provide a lubrication free rotary spindle thereby reducing the possibility that any particulates are introduced into the substrate processing area. The magnetic spindle bearings of the exemplary embodiments also reduce possible outgassing that may be caused by, for example, grease or other lubricants that may be used to lubricate the spindle of the drive section.

As may be realized, the exemplary embodiments described herein may be utilized separately or combined in any suitable manner for driving a motor of, for example a robotic transport or other equipment including, but not limited to, substrate aligners. As also may be realized, although the exemplary embodiments are described herein with respect to rotary motors, the exemplary embodiments are equally applicable for driving linear motor systems.

It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A drive section for a substrate transport arm comprising:
    a frame;
    at least one stator mounted within the frame, the stator including a first motor section and at least one stator bearing section; and
    a coaxial spindle magnetically supported substantially without contact by the at least one stator bearing section, where each drive shaft of the coaxial spindle includes a rotor, the rotor including a second motor section and at least one rotor bearing section configured to interface with the at least one stator bearing section;
    wherein the first motor section is configured to interface with the second motor section to effect rotation of the spindle about a predetermined axis and the at least one stator bearing section is configured to effect at least the substantially contactless support of the coaxial spindle and substantially solid state leveling of a substrate transport arm end effector connected to the coaxial spindle through an interaction with the at least one rotor bearing section.

2. The drive section of claim 1, wherein the at least one stator bearing section is configured to interface with the at least one rotor bearing section to change at least an angular orientation of the predetermined axis of rotation with respect to a centerline of the at least one stator.

3. The drive section of claim 1, wherein the frame is located within a housing, the drive section being coupled to the frame and configured to linearly translate the frame within the housing.

4. The drive section of claim 1, wherein the at least one stator and rotor are isolated from one another where the at least one stator operates in a first environment and the rotor operates in a second environment.

5. The drive section of claim 1, further comprising a drive section feedback system comprising at least one sensor configured to measure a planar position of the predetermined axis of rotation and an angular orientation of the predetermined axis of rotation.

6. The drive section of claim 1, wherein the coaxial spindle comprises at least two drive shafts each having a rotor and the at least one stator comprises at least two stators where each of the at least two stators is configured to interface with a respective one of the rotors and cause a change in angular orientation of the predetermined axis of rotation.

7. The drive section of claim 1, wherein the at least one stator bearing section is configured to interface with the rotor bearing section and axially offset a centerline of the coaxial spindle from a centerline of the at least one stator.

8. The drive section of claim 7, wherein axially offsetting the centerline of the coaxial spindle effects planar positional adjustment of the end effector.

9. The drive section of claim 1, wherein the at least one stator comprises two stators and the coaxial spindle comprises two drive shafts each having a respective rotor, where the two stators and the respective rotors provide six degrees of freedom for the drive section.

10. The drive section of claim 1, wherein the at least one stator comprises two stators and the coaxial spindle comprises two drive shafts each having a respective rotor, where the two stators and the respective rotors provide seven degrees of freedom for the drive unit.

* * * * *